(12) United States Patent
Sakayanagi et al.

(10) Patent No.: US 7,596,446 B1
(45) Date of Patent: Sep. 29, 2009

(54) CONTROL DEVICE

(75) Inventors: Yoshihiro Sakayanagi, Gotemba (JP); Tsuyoshi Fujikane, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/246,932

(22) Filed: Oct. 7, 2008

(51) Int. Cl.
*B60T 7/12* (2006.01)
*F02M 1/00* (2006.01)

(52) U.S. Cl. ............ 701/105; 123/434; 123/674; 701/114

(58) Field of Classification Search ......... 701/130, 701/104, 105, 114, 115; 123/434, 692, 696, 123/674, 406.11, 406.23, 406.19, 406.47
See application file for complete search history.

(56) References Cited

U.S. PATENT DOCUMENTS

| | | | |
|---|---|---|---|
| 5,079,705 A | * | 1/1992 | Sakai et al. .............. 701/57 |
| 6,494,801 B1 | * | 12/2002 | Ohtake et al. ............ 475/5 |
| 6,751,544 B2 | * | 6/2004 | Hashimoto et al. ....... 701/107 |
| 7,273,040 B2 | * | 9/2007 | Shouda et al. ............ 123/491 |
| 7,363,143 B2 | * | 4/2008 | Matsushima et al. ....... 701/113 |
| 2007/0023021 A1 | * | 2/2007 | Shouda et al. ............ 123/685 |
| 2007/0245817 A1 | * | 10/2007 | Matsushima et al. ...... 73/118.1 |

FOREIGN PATENT DOCUMENTS

| | | |
|---|---|---|
| JP | 03-182667 A | 8/1991 |
| JP | 04-063945 A | 2/1992 |

* cited by examiner

*Primary Examiner*—John T Kwon
(74) *Attorney, Agent, or Firm*—Sughrue Mion, PLLC

(57) ABSTRACT

A change in a torque request for an internal combustion engine during a prediction period is predicted as a change in a target torque. Further, a change in an outputtable upper-limit torque during the prediction period is calculated as an upper-limit torque change. When the target torque is greater than the upper-limit torque by more than a judgment value during the prediction period, control is exercised to increase an intake air amount. Moreover, the torque difference between the target torque and upper-limit torque at a second time, which is later than a first time, is calculated to correct the torque difference with higher responsiveness than exhibited for intake air amount control.

20 Claims, 11 Drawing Sheets

CONTROL DEVICE

FIELD OF THE INVENTION

The present invention relates to a control device. More specifically, the present invention relates to a control device that uses two types of output change means, which differ in responsiveness, to control the output to be generated.

BACKGROUND ART

When an internal combustion engine is operated, a requested torque is calculated in accordance with an accelerator operation amount. Further, an intake air amount necessary for generating the requested torque is determined. Subsequently, for example, a throttle valve opening (throttle opening), ignition timing, and fuel injection amount are selected in accordance with the intake air amount. Due to the volumetric capacity of an intake path positioned downstream of a throttle valve, however, there is a response lag (phase lag) between the instant at which the throttle opening is changed to the selected throttle opening and the instant at which an amount of air according to the selected throttle opening is actually supplied into a cylinder. Therefore, the selected ignition timing and fuel injection amount may not always be appropriate for the actual intake air amount.

Meanwhile, a control device disclosed in JP-A-1991-182667 controls the ignition timing and fuel injection amount during a transient operation of an internal combustion engine in accordance with the amount of intake air actually taken into a cylinder. More specifically, to compensate for a phase lag of the intake air amount, this control device estimates the amount of air to be actually supplied into the cylinder before the determination of the ignition timing and fuel injection amount and calculates an actual torque, which is to be actually generated, in accordance with the estimated air amount. Subsequently, this control device determines an optimum fuel injection amount and optimum ignition timing in accordance with the actual torque. The control device described above can compensate for a phase lag of the intake air amount even during a transient operation, supply the right amounts of fuel and air to each cylinder, and achieve ignition with optimum timing.

However, the control device determines the optimum fuel injection amount and ignition timing in accordance with the actual torque after estimating the actual intake air amount whose phase lag is to be compensated for and determining the actual torque from the actual intake air amount. Therefore, this may increase control parameter computation load, thereby causing control lag. The control process described above determines the optimum ignition timing and fuel injection amount in accordance with the calculated actual torque, but does not compensate for a response lag between the requested torque and the actual torque, which is based on the phase lag of the intake air amount. Therefore, it is difficult for the control device to change the intake air amount in accordance with the requested torque and generate torque in accordance with the requested torque in a situation where the requested torque changes within a period shorter than the phase lag time of intake air while an internal combustion engine is conducting, for instance, a transient operation.

SUMMARY OF THE INVENTION

An object of the present invention is to solve the above problem and provide an improved control device that is capable of curbing the influence of a response lag on control and generating an output in compliance with a request even when a requested output greatly changes.

According to one aspect of the present invention, a control device includes first and second output change device for changing an output. The second output changes the output with higher responsiveness than the first output change device. The first output change device is controlled by first control means so as to output a target output, and the second output change device is controlled by second control means so as to output a target output. A change in the target output that occurs during a predetermined prediction period is predicted by target output change prediction means. A change in a variable output range that can be brought about by the first output change device during the prediction period is predicted by variable output range prediction means. Output out-of-range judgment means judges whether a deviation of the target output from the variable output range is greater than a judgment value during the prediction period. When the deviation is judged to be greater than the judgment value, the first control means causes the first output change device to start to changing the output in accordance with the variable output range. The output difference between the target output and the output changed by the first output change means is calculated by output difference calculation means. When the deviation is judged to be greater than the judgment value, the second control means controls the second output change device in accordance with the output difference.

According to another aspect of the present invention, the judgment value is zero.

According to another aspect of the present invention, the target output change prediction means estimates a change in the target output during the prediction period as a target output change pattern. The variable output range prediction means estimates a change in the variable output range during the prediction period as a variable output range pattern. The output out-of-range judgment means judges a timing with which the target output agrees with the variable output range. The first control means controls the first output change device so that the output changes in accordance with the variable output range pattern with a timing with which the target output agrees with the variable output range.

According to another aspect of the present invention, the control device includes maximum judgment means for judging whether the target output exceeds a maximum output of the variable output range during the prediction period. When the target output is judged to exceed the maximum output, the target output of a portion in which the target output is greater than the maximum output is corrected by target output correction means so that the target output agrees with the maximum output.

According to another aspect of the present invention, a short-period change of the target output that periodically occurs at intervals shorter than response lag time relative to an output change brought about by the first output change device is detected by short-period change detection means. Short-period output average calculation means calculates the average of the target output during the short-period change. Short-period output amplitude calculation means calculates the amplitude of the target output during the short-period change. Short-period upper-limit output calculation means calculates a short-period upper-limit output for the short-period change, using the sum of the average of the target output during the short-period change and half the amplitude during the short-period change. The output out-of-range judgment means judges whether a deviation of the short-period upper-limit output, instead of the target output, from variable output range is greater than the judgment. When the deviation is judged to be greater than the judgment value, the first control means causes the first output change device to start changing the output in accordance with the variable output range. The output difference calculation means calculates, as the output difference, a difference between the short-period upper-limit output and the target output during the short-period change.

According to another aspect of the present invention, a control device includes first output change device for changing the output, and second output change device for changing the output with higher responsiveness than the first output change device. Target output change prediction means predicts a change in the target output that occurs during a predetermined prediction period. Variable output range prediction means predicts a change in a variable output range that can be brought about by the first output change device during the prediction period. Variable output range change pattern calculation means calculates a change pattern of the variable output range so that a total deviation of the target output from the output range is minimized during the prediction period. First control means controls the output change brought about by the first output change device in accordance with the change pattern of the output range. Output difference calculation means calculates, at a current time during the prediction period, the output difference between the target output and the output of the change pattern at the current time that can be changed by the first output change device. Second control means causes the second output change device to correct the output difference.

According to another aspect of the present invention, the control device controls the output of the internal combustion engine. The first output change device changes an intake air amount for the internal combustion engine. The target output change prediction means regards a target torque for the internal combustion engine as the target output and predicts a change in the target output. The variable output range prediction means regards an available torque range, which can be output when the intake air amount is changed in a current operating state of the internal combustion engine, as the variable output range and predicts a change in the variable output range.

According to another aspect of the present invention, the first output change device is a throttle valve positioned in an intake path of the internal combustion engine. The first control means controls the intake air amount by controlling the opening of the throttle valve.

According to another aspect of the present invention, the second output change device is ignition means for the internal combustion engine. Basic ignition timing calculation means calculates basic ignition timing in accordance with the intake air amount prevailing at a point of time during the prediction period. Retard amount calculation means calculates an ignition timing retard amount relative to the basic ignition timing in accordance with the output difference. Corrected ignition timing setup means sets corrected ignition timing that is obtained by retarding the basic ignition timing in accordance with the ignition timing retard amount. The second control means controls ignition timing in accordance with the corrected ignition timing.

According to another aspect of the present invention, accelerator operation amount detection means detects an accelerator operation amount. Requested torque calculation means calculates a requested torque in accordance with a change in the accelerator operation amount. The target output change prediction means predicts a torque determined by retarding the requested torque by retardation time as the target output.

According to one aspect of the present invention, a control device includes first and second output change device for changing an output. The second output changes the output with higher responsiveness than the first output change device. The first output change device is controlled by first controller so as to output a target output, and the second output change device is controlled by second controller so as to output a target output. A change in the target output that occurs during a predetermined prediction period is predicted by target output change prediction device. A change in a variable output range that can be brought about by the first output change device during the prediction period is predicted by variable output range prediction device. Output out-of-range judgment device judges whether a deviation of the target output from the variable output range is greater than a judgment value during the prediction period. When the deviation is judged to be greater than the judgment value, the first controller causes the first output change device to start to changing the output in accordance with the variable output range. The output difference between the target output and the output changed by the first output change device is calculated by output difference calculator. When the deviation is judged to be greater than the judgment value, the second controller controls the second output change device in accordance with the output difference.

According to another aspect of the present invention, a control device includes first output change device for changing the output, and second output change device for changing the output with higher responsiveness than the first output change device. Target output change prediction device predicts a change in the target output that occurs during a predetermined prediction period. Variable output range prediction device predicts a change in a variable output range that can be brought about by the first output change device during the prediction period. Variable output range change pattern calculator calculates a change pattern of the variable output range so that a total deviation of the target output from the output range is minimized during the prediction period. First controller controls the output change brought about by the first output change device in accordance with the change pattern of the output range. Output difference calculator calculates, at a current time during the prediction period, the output difference between the target output and the output of the change pattern at the current time that can be changed by the first output change device. Second controller causes the second output change device to correct the output difference.

Other objects and further features of the present invention will be apparent from the following detailed description when read in conjunction with the accompanying drawings.

DETAILED DESCRIPTION OF THE PREFERRED EMBODIMENT

Figure 1:
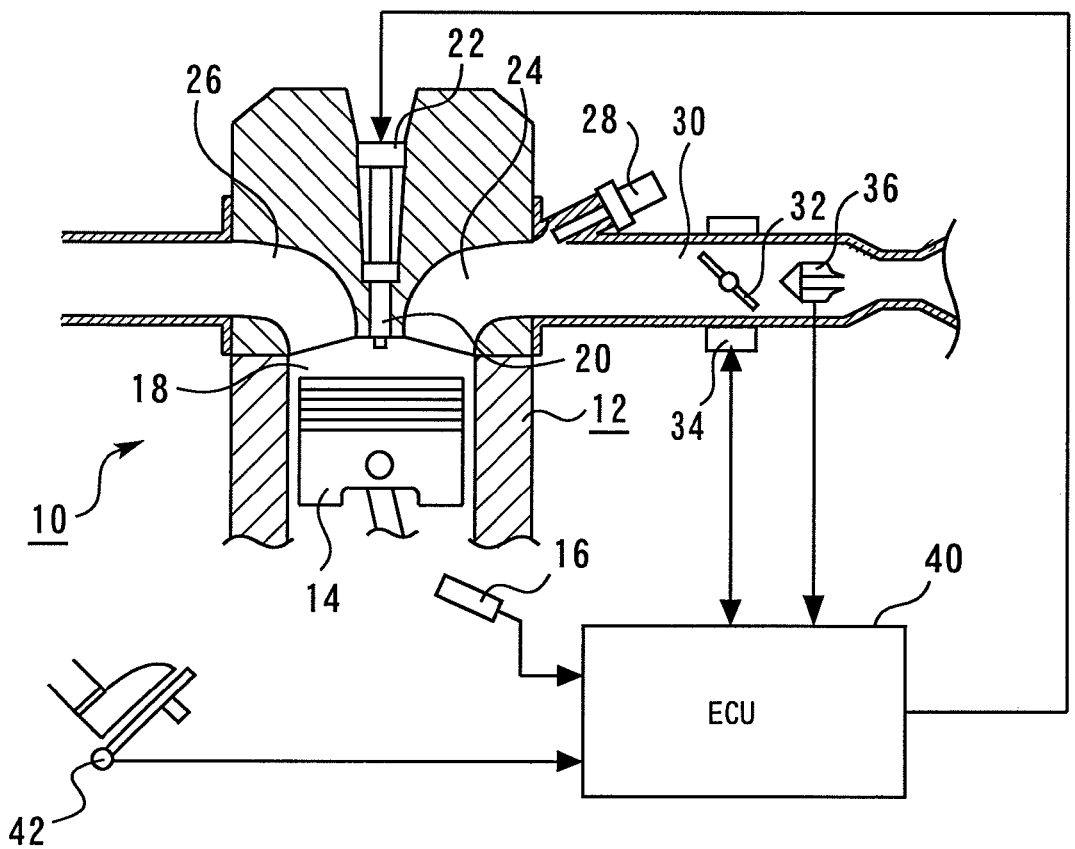
FIG. 1 is a schematic diagram illustrating the configuration of an internal combustion engine system according to a first embodiment of the present invention.

Embodiments of the present invention will now be described with reference to the accompanying drawings. Like elements in the drawings are designated by the same reference numerals and will be described in an abbreviated manner or will not be redundantly described.

First Embodiment

[System Configuration of First Embodiment]

FIG. 1 is a schematic diagram illustrating the configuration of an internal combustion engine system according to a first embodiment of the present invention. The system shown in FIG. 1 includes an internal combustion engine 10. The internal combustion engine includes a cylinder 12. Although FIG. 1 shows only a cross-section of one cylinder 12, the internal combustion engine 10 actually has a plurality of cylinders 12. A piston 14 is positioned inside each cylinder 12. The piston 14 is connected to a crankshaft (not shown) via a connecting rod. A rotation speed sensor 16 is positioned near the crankshaft to generate an output according to the engine speed of the internal combustion engine 10.

A combustion chamber 18 is positioned over the piston 14 within the cylinder 12. An ignition plug 20 is attached to the center of the ceiling (cylinder head) of the combustion chamber 18 in such a manner that a gap at its leading end protrudes into the combustion chamber 18. The timing of ignition by the ignition plug 20 is electrically controlled via an actuator 22. The ceiling of the combustion chamber 18 communicates with an intake port 24 and an exhaust port 26. A port injector 28 is installed in the intake port 24 in such a manner that an injection tip at its leading end protrudes into the intake port 24.

A common intake path 30 is connected to the intake port 24 for each cylinder 12. The intake path 30 is provided with an electronically controlled throttle valve 32. The opening of the throttle valve 32 can be varied to adjust the amount of air flowing into the intake path 30. The opening of the throttle valve 32 (throttle opening) is electrically controlled via an actuator 34 in accordance, for instance, with an acceleration/deceleration request based, for instance, on an accelerator operation. In other words, the throttle opening can be controlled independently of the accelerator opening. An air flow meter 36 is installed in the intake path 30 and positioned upstream of the throttle valve 32. The air flow meter 36 generates an output according to the rate of air flow into the intake path 30.

The internal combustion engine system according to the first embodiment includes an ECU (Electronic Control Unit) 40. The ECU 40 is electrically connected to the rotation speed sensor 16, air flow meter 36, accelerator opening sensor 42, and various other sensors. The ECU 40 acquires information required for controlling the internal combustion engine 10 from these sensors. Further, the ECU 40 is electrically connected, for instance, to the actuators 22, 34, and controls, for instance, ignition timing and throttle opening in accordance with the acquired information.

[Throttle Opening and Ignition Timing Control]

Figure 2:
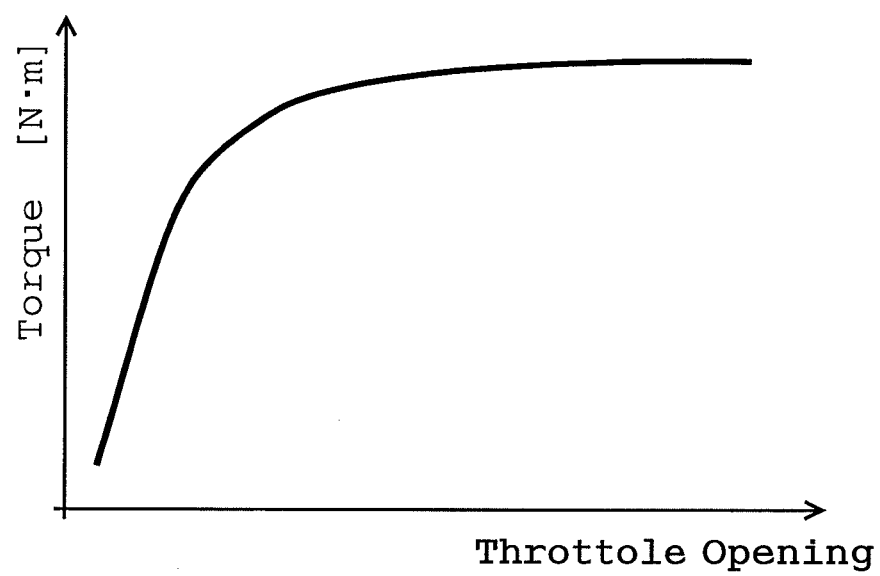
FIG. 2 illustrates the relationship between the throttle opening and torque.

FIG. 2 shows the relationship between the throttle opening and torque. In FIG. 2, the horizontal axis represents the throttle opening whereas the vertical axis represents the torque. An intake air amount increases with an increase in the throttle opening. Therefore, the torque to be generated increases with an increase in the throttle opening as shown in FIG. 2. In the system according to the first embodiment, a basic throttle opening for a normal internal combustion engine operation is set in accordance with the relationship shown in FIG. 2. More, specifically, the basic throttle opening is set to be large when a requested torque is great and set to be small when the requested torque is small. The ECU 40 stores in advance a map that defines the throttle opening-torque relationship that is shown, for instance, in FIG. 2. While the internal combustion engine 10 is conducting a normal operation, the basic throttle opening according to the requested torque is set in accordance with the map to control the throttle opening. Consequently, control is exercised so that the amount of intake air flowing into the intake path 30 agrees with an intake air amount according to the basic throttle opening.

However, there are the intake path 30 and intake port 24 between the throttle valve 32 and the cylinder 12. Due to the volumetric capacity of the intake path 30 and intake port 24, a lag occurs between the instant at which the throttle opening is set to the basic throttle opening in accordance with the requested torque and the instant at which the resulting amount of air, which is appropriate for the newly set throttle opening, is actually taken into the cylinder 12. Therefore, if the requested torque drastically changes, a long response lag occurs in the actual intake of an amount of air necessary for generating the requested torque.

Figure 3:
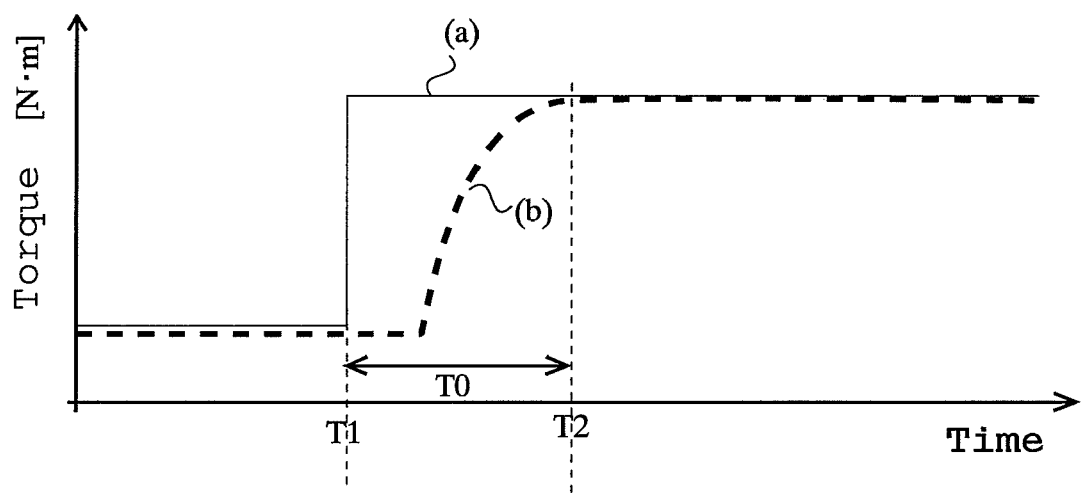
FIG. 3 illustrates the change in the generated torque when control is exercised in accordance with the requested torque so that the throttle opening agrees with the basic throttle opening.
Figure 4:
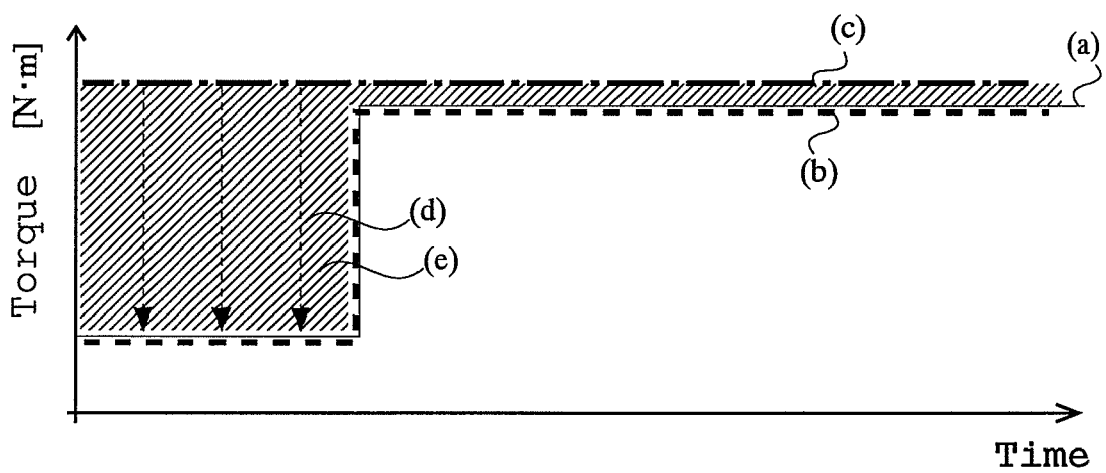
FIG. 4 illustrates an example in which torque is generated in accordance with a requested torque by exercising ignition timing control in addition to throttle opening control.

FIGS. 3 and 4 illustrate the relationship between requested torque and generated torque. In FIGS. 3 and 4, the horizontal axis represents time whereas the vertical axis represents torque. FIG. 3 shows how the generated torque changes when control is exercised in accordance with the requested torque so that the throttle opening agrees with the basic throttle opening. When the requested torque drastically changes at time T1 as indicated by a solid line (a) in FIG. 3, the throttle opening is immediately changed to match the requested torque. In this instance, the generated torque gradually increases with an increase in the intake air amount as indicated by a broken line (b), and eventually reaches the requested torque at time T2, which is later than time T1 by response lag time T0. It is therefore difficult to immediately generate the requested torque in response to a drastic change in the requested torque if control is merely exercised in accordance with the requested torque so that the throttle opening agrees with the basic throttle opening.

While a normal operation is conducted, the ignition timing is set to an MBT (minimum advance for the best torque) ignition timing, which provides optimum combustion efficiency to optimize specific fuel consumption and output under current conditions, including the current intake air amount and engine speed. Therefore, if the ignition timing is retarded from MBT while the intake air amount remains unchanged, the combustion efficiency decreases to decrease the generated torque. Here, the ignition timing is controlled as a control signal sent from the ECU 40 to the actuator 22 directly controls the ignition of the ignition plug 20. Therefore, the control signal from the ECU 40 can be used to instantly change an ignition timing setting and exercise control so that the ignition timing agrees with the setting. Further, the combustion efficiency immediately decreases when the ignition timing is retarded. Therefore, a torque decrease due to retarded ignition timing can be achieved with higher responsiveness than intake air amount responsiveness and with a slight response lag.

FIG. 4 shows an example in which torque is generated in accordance with a requested torque by exercising ignition timing control in addition to throttle opening control. More specifically, control is exercised so as to change the throttle opening to a controllable maximum opening (fully-open state) before the requested torque (a) drastically increases at time T1. Therefore, the intake air amount is also maximized. Upper-limit torque, which is the maximum torque that can be generated in this state, is greater than a torque generated when the requested torque is drastically increased, as indicated by a one-dot chain line (c) in FIG. 4.

The upper-limit torque (c) is the maximum torque that can be generated when the throttle opening is maximized to invoke a fully-open state with the ignition timing set to MBT. Therefore, the torque to be actually generated can be rendered smaller than the upper-limit torque by retarding the ignition timing from MBT. In other words, when control is exercised to retard the ignition timing from MBT for the purpose of decreasing the torque by an amount indicated by arrows (d), the generated torque matches the requested torque (a) as indicated by a broken line (b).

However, torque control exercised by retarding the ignition timing as described above decreases the torque by decreasing the combustion efficiency from an optimum level. In other words, when control is exercised as described above, the fuel efficiency decreases to cause a fuel consumption loss in a region (shaded portion (e)) where the torque is decreased by retarding the ignition timing. It is preferred that such a loss be minimized in consideration for fuel efficiency improvement. Therefore, the system according to the first embodiment exercises control as described below to generate torque in accordance with requested torque while minimizing such a loss.

[Characteristic Control by First Embodiment]

Figure 5:
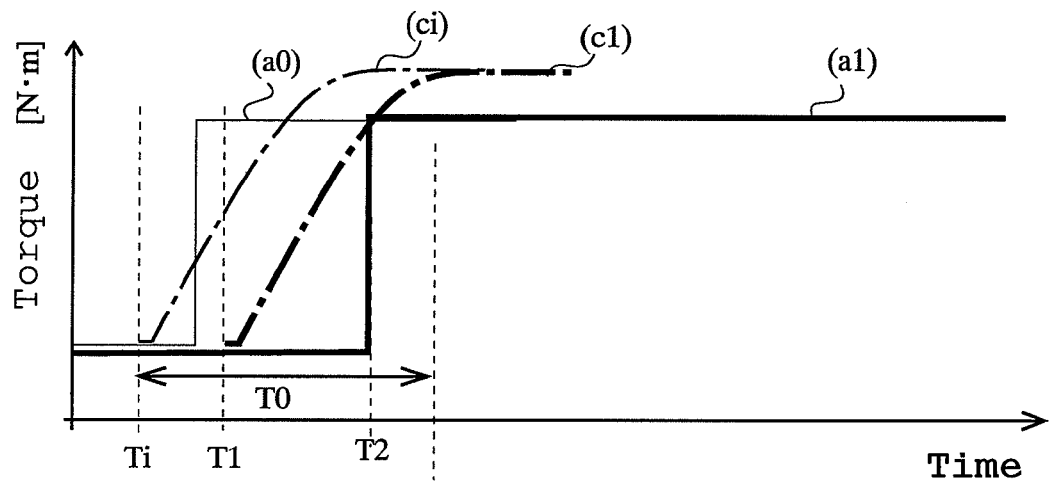
FIG. 5 illustrates the changes in the target torque and in the upper-limit torque in the first embodiment of the present invention.

FIG. 5 illustrates how the first embodiment exercises torque control. In FIG. 5, the horizontal axis represents time whereas the vertical axis represents torque. In accordance with a user-requested torque indicated by a thin solid line (a0) in FIG. 5, the first embodiment predicts a change in the requested torque and sets a target torque as indicated by a thick solid line (a1). More specifically, the first embodiment generates a requested torque, which is based on a user's request, with a certain lag that the user does not feel uncomfortable with. The target torque is set as the target to be achieved, and calculated while retarding the currently requested torque (a0) by a certain amount of lag time. A prediction period for predicting the target torque is an interval between the present time Ti and the instant at which the response lag time T0 for the intake air amount elapses.

A one-dot chain line (ci) in FIG. 5 indicates a change in the torque (upper-limit torque) that occurs when the throttle opening is changed from the current opening to a fully-open state with the ignition timing set to MBT at a certain time T1 (i>0). In other words, the upper-limit torque (ci) represents a change in the maximum torque that can be generated in an operating state prevailing at time Ti. When the throttle opening is set to a fully-open state at time Ti, the amount of intake air actually taken into the cylinder 12 begins to gradually increase with a slight time lag. The maximum intake air amount corresponding to a fully-open throttle is then reached within the response lag time T0. In this instance, the upper-limit torque (ci) also follows a change in the intake air amount; therefore, the maximum torque (maximum output), which is obtained by maximizing the throttle opening to invoke a fully-open state, is attained when the response lag time T0 elapses.

The upper-limit torque change (ci) described above is repeatedly predicted at time T1 at which the throttle opening and MBT ignition timing are set. As a result, an upper-limit torque change (c1) predicted, for instance, at time T1 may partly overlap with the target torque (a1). In such an instance, namely at the time T1, the throttle opening is immediately maximized to invoke a fully-open state. Consequently, the intake air amount gradually increases after time T1, thereby increasing the upper-limit torque (c1). This makes it possible to obtain the required minimum amount of intake air by time T2 at which the target torque (a1) is expected to reach the upper-limit torque (c1) predicted at the current time T1, and create a state where a torque equivalent to the target torque can be generated.

Figure 6:
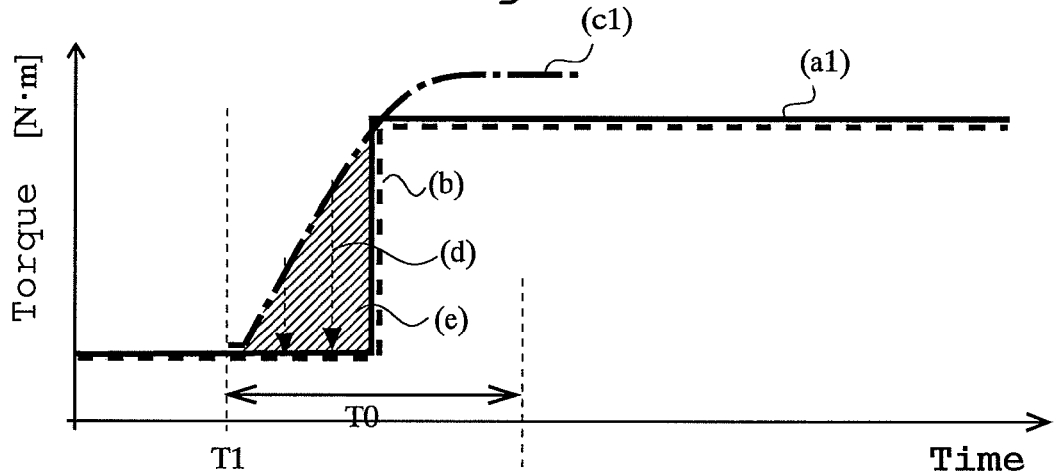
FIG. 6 illustrates the upper-limit torque, which can be generated when the throttle opening is maximized to invoke a fully-open state at time T1, and torque decrease control, which is exercised by retarding the ignition timing in the first embodiment of the present invention.

FIG. 6 illustrates the upper-limit torque, which can be generated when the throttle opening is maximized to invoke a fully-open state at time T1, and torque decrease control, which is exercised by retarding the ignition timing. In FIG. 6, the horizontal axis represents time whereas the vertical axis represents torque. When the throttle opening is maximized to invoke a fully-open state at time T1 as mentioned above, the available upper-limit torque (c1) can be raised to a torque equivalent to the target torque by time T2 at which the target torque (a1) drastically increases. However, there is a torque difference, which is indicated by arrows (d) in FIG. 6, between the upper-limit torque (c1) and target torque (a1) during the interval between time T1 at which the throttle opening is maximized to invoke a fully-open state and time T2 at which the target torque drastically increases. Therefore, the system according to the first embodiment exercises control to correct the torque difference by retarding the ignition timing. Control provided in the above manner by the first embodiment is hereinafter referred to as torque decrease correction control.

Figure 7:
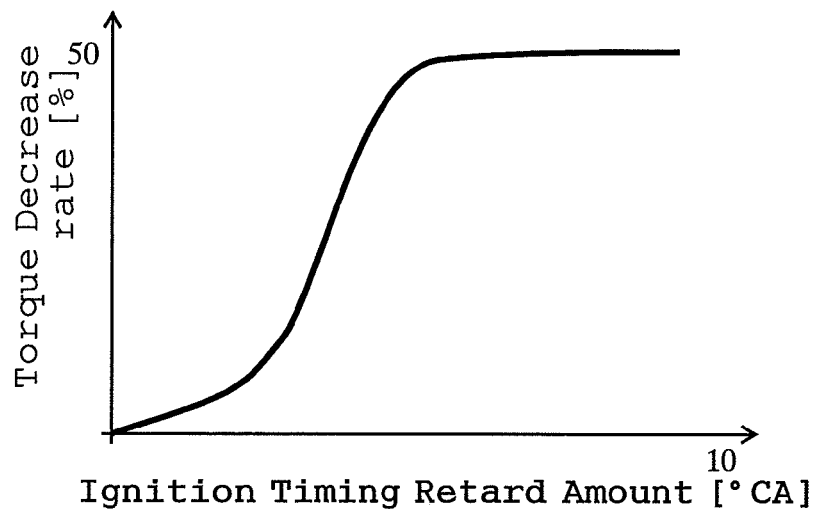
FIG. 7 illustrates the relationship between an ignition timing retard amount and torque decrease rate.

FIG. 7 illustrates the relationship between an ignition timing retard amount and torque decrease rate. In FIG. 7, the horizontal axis represents the ignition timing retard amount (CA) whereas the vertical axis represents the torque decrease rate (%). As shown in FIG. 7, the torque decrease rate gradually increases with an increase in the ignition timing retard amount relative to the MBT ignition timing. When the ignition timing is retarded from MBT, the generated torque can be decreased down to approximately 50% of the upper-limit torque in accordance with the relationship described above.

More specifically, when the retard amount is to be calculated, the value of the upper-limit torque at time Ti, which is later than time T1 at which the throttle opening is maximized to invoke the fully-open state, is first estimated, for instance, from the intake air amount at time T1 and the engine speed at time Ti. Next, the proportion of the target torque at time Ti to the estimated value of the upper-limit torque at time Ti is calculated as the torque decrease rate (%) in accordance with Equation (1) below.

$$\text{Torque decrease rate} = \text{target torque/upper-limit torque} \quad (1)$$

The ECU 40 stores in advance a map that defines the relationship between the ignition timing retard amount (° CA.) and torque decrease rate (%) in accordance with the relationship shown in FIG. 7. The ignition timing retard amount is determined in accordance with the map and the torque decrease rate calculated from Equation (1) to exercise retard control over the ignition timing. This makes it possible to decrease the upper-limit torque (c1), which is obtained when the throttle opening is maximized to invoke a fully-open state, by the torque difference (arrows (d)), thereby providing a generated torque (b) according to the requested torque.

After control has been exercised as described above, the predicted upper-limit torque (c1) exceeds the target torque (a1) again. When the upper-limit torque is greater than the target torque, control is exercised so that the throttle opening is changed from a fully-open state to an opening appropriate for the target torque. The intake air amount then gradually matches the target torque. Consequently, the ignition retard amount decreases to zero, thereby returning the ignition timing to MBT.

The amount of intake air actually taken into the cylinder 12 reaches the maximum intake air amount, which is provided when the throttle opening is maximized, during the interval between the instant at which the throttle opening is maximized and the instant at which the intake air response lag time T0 elapses later. Therefore, control for preparing for a torque increase by maximizing the throttle opening can be exercised in time if it is exercised at a point of time that is earlier than a change in the target torque by the intake air response lag time T0 even when the maximum intake air amount is required due to a drastic increase of the target torque to the maximum torque. Further, a torque change before the response lag time T0 can be properly handled by exercising control when the torque change is within the duration of response lag time T0.

Meanwhile, if the prediction period is longer than necessary, control may be started to fully open the throttle valve 32 due to a target torque change that occurs later and does not immediately need a fully-open state of the throttle valve 32. If the throttle valve 32 is fully opened prematurely as described above, torque decrease correction control is exercised to provide an increased amount of torque adjustment. As described earlier, torque decrease correction control, which is provided by retarding the ignition timing, is implemented by decreasing the combustion efficiency. From the viewpoint of fuel efficiency improvement, therefore, it is preferred that the amount of torque correction provided by torque decrease correction control be small.

Consequently, it is preferred the prediction period from the present time Ti, which is the duration of time for comparing the target torque and upper-limit torque, be set to be adequate and shortest. Therefore, the first embodiment performs setup so that the prediction period is equal to the response lag time T0, that is, the time required between the instant at which the throttle opening is set up and the instant at which an amount of intake air according to the resulting throttle opening is actually taken into the cylinder 12.

As such being the case, the system according to the first embodiment sets, at a certain point of time Ti, the duration of intake air response lag time T0 from time Ti as the prediction period T for comparing a change (ci) in the upper-limit torque and a change (a1) in the target torque. When condition A below is satisfied within the prediction period T, control is exercised so as to immediately maximize the throttle opening.

$$\text{Upper-limit torque (ci)} - \text{target torque (a1)} \leq 0$$
$$(Ti < T < Ti + T0) \quad \text{(Condition A)}$$

A shaded portion (e) in FIG. 6 represents a region where the combustion efficiency is reduced by maximizing the throttle opening and exercising torque decrease correction control by means of ignition timing retardation. When control is exercised in accordance with the first embodiment, it is possible to estimate the target torque and upper-limit torque and then maximize the throttle opening at critical time within a range within which the target torque can be generated. Therefore, a torque according to the target torque can be generated while minimizing the decrease in the combustion efficiency and coping with a drastic change.

[Control Routine Executed by First Embodiment]

Figure 8:
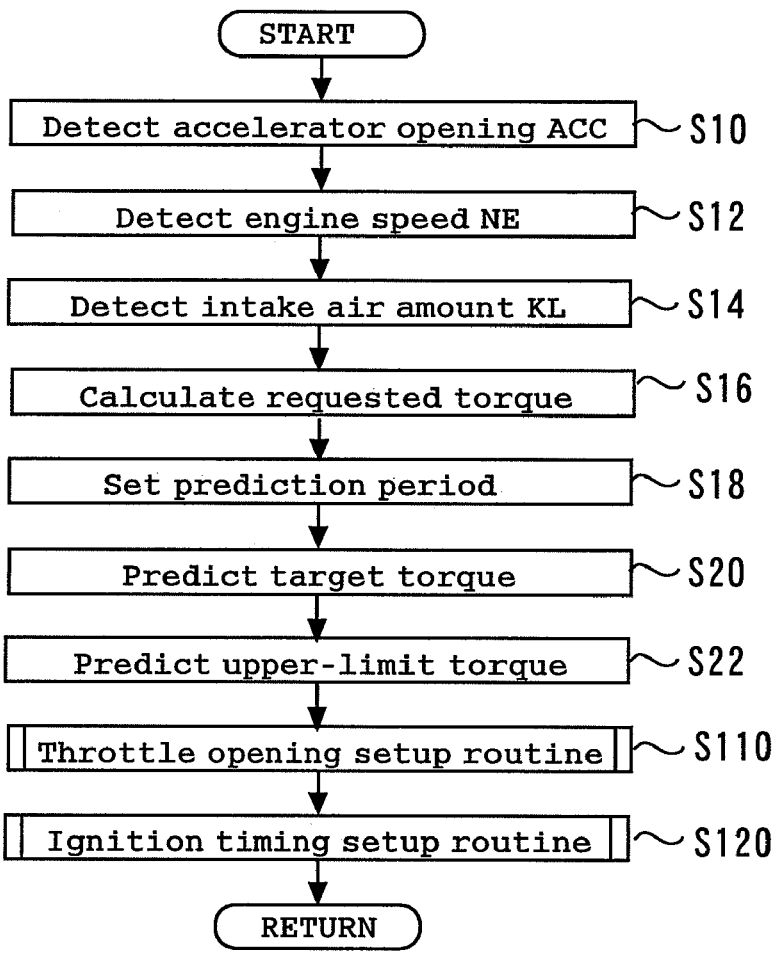
FIGS. 8 to 10 are flowcharts illustrating control routines that the ECU 40 executes in accordance with the first embodiment of the present invention.
Figure 9:
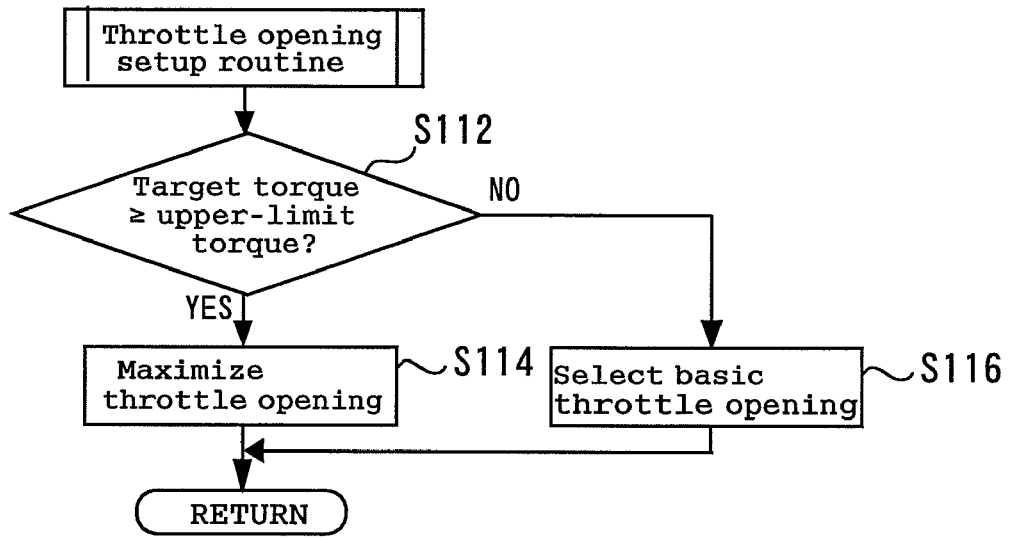
Figure 10:
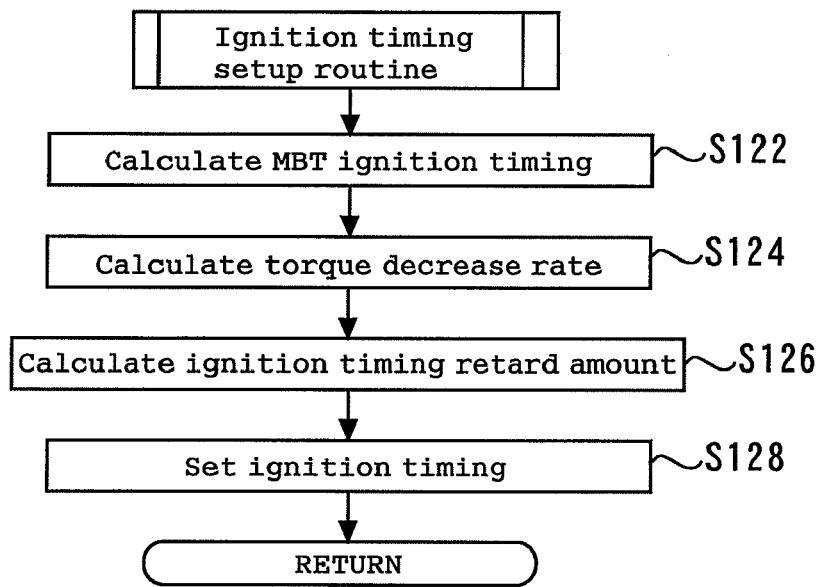

FIGS. 8 to 10 are flowcharts illustrating control routines that the ECU 40 executes in accordance with the first embodiment. The routine shown in FIG. 8 is repeatedly executed at regular intervals during an operation of the internal combustion engine 10. First of all, in the routine shown in FIG. 8 step S10 is performed to detect an accelerator opening ACC. The accelerator opening ACC is determined by the ECU 40 in accordance with an output from the accelerator opening sensor 42. Next, step S12 is performed to detect the engine speed NE. The engine speed NE is determined by the ECU 40 in accordance with an output from the crank angle sensor 16. Next, step S14 is performed to detect the intake air amount KL. The intake air amount KL is determined by the ECU 40 in accordance with an output from the air flow meter 36.

Next, step S16 is performed to calculate a requested torque. The requested torque is determined in accordance with an operation amount for the accelerator opening ACC. Next, step S18 is performed to set the prediction period. The prediction period is set as the duration of time Ti+T0 between the present time Ti and a point of time at which the response lag time T0 elapses. The ECU 40 stores the response lag time T0 in advance. Next, step S20 is performed to calculate a target torque. The target torque is obtained by retarding the requested torque prevailing at the present time Ti by the lag time. Next, step S22 is performed to calculate a change that occurs after the present time Ti in the upper-limit torque generated by maximizing the throttle opening. The upper-limit torque is calculated in accordance with the engine speed NE, intake air amount KL, and other current operating states of the internal combustion engine 10 and the resulting changes, for instance, in the intake air amount.

Next, step S110 is performed to execute a throttle opening setup routine, which is shown in FIG. 9. First of all, in the throttle opening setup routine shown in FIG. 9, step S112 is performed to judge whether condition A, which is described earlier, is established, that is, whether the target torque reaches or exceeds the upper-limit torque during the prediction period (Ti<T<Ti+T0) calculated in step S18. If the judgment result obtained in step S112 indicates that condition A is established, step S114 is performed to maximize the throttle opening. This makes it possible to increase the available upper-limit torque in advance and cope with a drastic increase in the target torque that may occur during the prediction period.

If, on the other hand, the judgment result obtained in step S112 does not indicate that condition A is established, step S116 is performed to select a basic throttle opening according to the currently requested torque as the throttle opening. After step S114 or S116 is performed to set the throttle opening as described above, the throttle opening setup routine shown in FIG. 9 temporarily terminates.

Next, an ignition timing setup routine shown in FIG. 10 is executed in step S120 of the routine shown in FIG. 8. First of all, the routine shown in FIG. 10 performs step S122 to calculate an MBT ignition timing as the basic ignition timing. The MBT ignition timing is determined from the detected intake air amount KL and engine speed NE in accordance with a map defining the relationship between the intake air amount, engine speed, and ignition timing.

Next, step S124 is performed to calculate the torque decrease rate. The torque decrease rate is calculated from Equation (1) above as the proportion of the target torque to the upper-limit torque at the present time. Next, step S126 is performed to determine the ignition timing retard amount in accordance with the torque decrease rate. The ignition timing retard amount is determined from the torque decrease rate, which is obtained in step S124, in accordance with a map that is stored in advance in the ECU 40 to define the relationship between the torque decrease rate and ignition timing. If the throttle opening is set in step S116 to the basic throttle opening, the torque difference between the upper-limit torque and target torque is zero. Therefore, the torque decrease rate calculated in step S124 is zero. Further, the ignition timing retard amount is also set to zero. If, on the other hand, the throttle opening is maximized in step S114, there is a torque difference between the upper-limit torque and target torque. Therefore, the ignition timing retard amount is set so as to reduce the torque difference in accordance with the torque decrease rate.

Next, step S128 is performed to set the ignition timing. The ignition timing to be set is determined by retarding the MBT ignition timing, which is determined in step S122, in accordance with the ignition timing retard amount determined in step S126. The routine shown in FIG. 10 is then terminated to temporarily terminate the routine shown in FIG. 8.

The routine shown in FIG. 8 is repeatedly executed during an operation of the internal combustion engine. Therefore, if, for instance, the routine is repeated at a certain time T4 so that condition A (upper-limit torque−target torque≦0 (T4<T<T4+T0)) is established in step S112, the routine fully opens the throttle valve to become ready to generate the upper-limit torque, and exercises torque decrease correction control by retarding the ignition timing. Further, if the routine is repeated again at a certain later time T5 so that condition A is not established in step S112, step S116 is performed to select a basic throttle opening according to the target torque as the throttle opening. Consequently, the routine reduces the ignition timing retard amount to zero, reverts to the MBT ignition timing, and exercises control in a manner appropriate for a normal operation.

The first embodiment assumes that the target torque is determined by retarding the requested torque to such an extent as not to make the user feel uncomfortable. However, the present invention is not limited to the use of such a target torque. When, for instance, a torque change is predicted in terms of electrical control in a situation where a transmission control or automatic operation is conducted, the waveform of the target torque can be calculated in accordance with the prediction to exercise control in the same manner as described above.

Further, a torque change occurring after an elapse of the response lag time T0 from the present time can be coped with even if control is initiated when the torque change is within the response lag time T0. Furthermore, when the prediction period is set to the response lag time T0, the prediction period can be minimized within a range within which a torque change can be coped with. Prediction can therefore be performed over an adequate range. This makes it possible to exercise torque control with increased certainty on the basis of more accurate prediction and reduce a decrease in fuel efficiency. Consequently, the system according to the first embodiment sets the prediction period to be equal to the interval between a certain point of time Ti and the instant at which the response lag time T0 elapses.

However, the present invention is not limited to the use of the above prediction period. Alternatively, future prediction may be performed beyond the response lag time T0. Another alternative would be to perform prediction within a period shorter than the response lag time T0. Using a short prediction period makes it possible to exercise control with increased accuracy and reduce the amount of combustion efficiency decrease caused by torque decrease correction control based on ignition timing retardation. However, when the prediction period is set to be shorter than the response lag time T0, a response might not be made in time even if control is exercised to immediately maximize the throttle opening. In this instance, however, it is still possible to reduce the amount of torque deficiency.

Moreover, the first embodiment assumes that condition A, which is for maximizing the throttle opening, is set for a situation where the target torque reaches or exceeds the upper-limit torque within the prediction period. However, the present invention is not limited to the use of condition A. For example, condition A1, which is indicated below, may be set instead of condition A.

Upper-limit torque−target torque≦α(Ti<T<Ti+T0)  (Condition A1)

In condition A1, the value α represents a certain margin. If α<0, the throttle opening is maximized when the target torque is greater than the upper-limit torque. In this instance, the loss of fuel efficiency in torque decrease correction control based on ignition timing retardation can be reduced by retarding the timing for throttle opening maximization. If, on the other hand, α>0, the throttle opening is maximized while the target torque is more or less greater than the upper-limit torque. The use of the above method makes it possible to cope with a drastic target torque increase during the prediction period with increased certainty.

As described above, control based on intake air amount covers a wide control range but exhibits a great response lag, whereas control based on ignition timing exhibits high responsiveness and small response lag but covers a narrow control range. The first embodiment achieves a target torque by using a combination of control based on intake air amount and control based on ignition timing, which differ in control properties as mentioned above. However, the present invention is not limited to the use of such control targets and means. More specifically, the present invention can also be applied to a different type of control in which a requested target output can be generated by exercising control with a combination of two types of control means, which differ in control properties.

Second Embodiment

A second embodiment of the present invention will now be described with reference to FIGS. 11 and 12. However, characteristic portions of the second embodiment will be mainly described while briefly describing matters common to the first and second embodiments or skipping the description of such matters.

The system according to the second embodiment has the same configuration as the system shown in FIG. 1. Further, the system according to the second embodiment provides the same control as the system according to the first embodiment except that they differ in the process to be performed when the target torque is greater than the upper-limit torque. More specifically, the system according to the second embodiment also determines the target torque and upper-limit torque, and exercises control to maximize the throttle opening if the target torque reaches or exceeds the upper-limit torque within the prediction period. The prediction period is set to be equal to the response lag time T0, which is required between the instant at which the throttle opening is maximized to invoke a fully-open state and the instant at which the intake air amount is maximized to match the fully-open state. Therefore, if a drastic target torque increase is predicted, control can be exercised in advance to create a state where a torque equivalent to the drastically increased target torque can be generated. However, even when control is exercised to set the prediction period as mentioned above and maximize the throttle opening in advance, it is practically impossible to generate a target torque greater than the maximum torque that can be generated when the intake air amount is maximized. A characteristic process that the second embodiment performs when a requested target torque is greater than the maximum torque will be described below.

Figure 11:
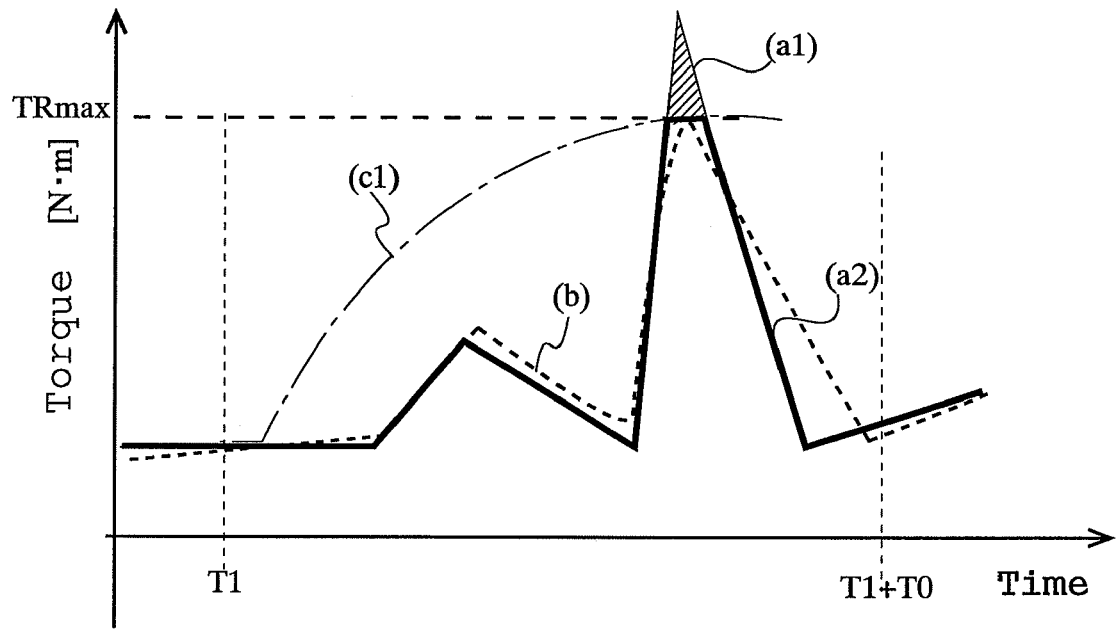
FIG. 11 illustrates how control is exercised when the target torque is greater than the upper-limit torque.

FIG. 11 illustrates how control is exercised when the target torque is greater than the upper-limit torque. When the target torque (a1) is greater than the maximum torque TRmax, which can be generated when the intake air amount is maximized, the target torque (a1) of a portion in which the target torque is greater than the maximum torque TRmax is replaced by the maximum torque TRmax for correction purposes as indicated in FIG. 11. The waveform of the target torque is now replaced by the waveform of a corrected target torque, which is obtained by correcting a portion greater than the maximum torque to the maximum torque as indicated by a thick solid line (a2) in FIG. 11.

In the second embodiment, the throttle opening and ignition timing are controlled in the same manner as in the first embodiment but in accordance with the waveform (a2) of the corrected target torque, which is obtained as described above. More specifically, the corrected target torque (a2) is compared against the upper-limit torque (ci) at time Ti during the prediction period to judge whether condition A is established. If the upper-limit torque−corrected target torque≦0 in any portion, the throttle opening is immediately maximized at time Ti.

Further, if the upper-limit torque (ci) is greater than the corrected target torque (a2) after the throttle opening is maximized, torque decrease correction control is exercised by retarding the ignition timing so that the generated torque agrees with the corrected target torque. More specifically, when torque decrease correction control is exercised, the target torque in Equation (1) is replaced by the corrected target torque so that the torque decrease rate is determined as the proportion of the corrected target torque to the upper-limit torque. As far as control is exercised in the above manner, a torque that can be output and close to the target torque can be generated even when the target torque is greater than the maximum torque.

Figure 12:
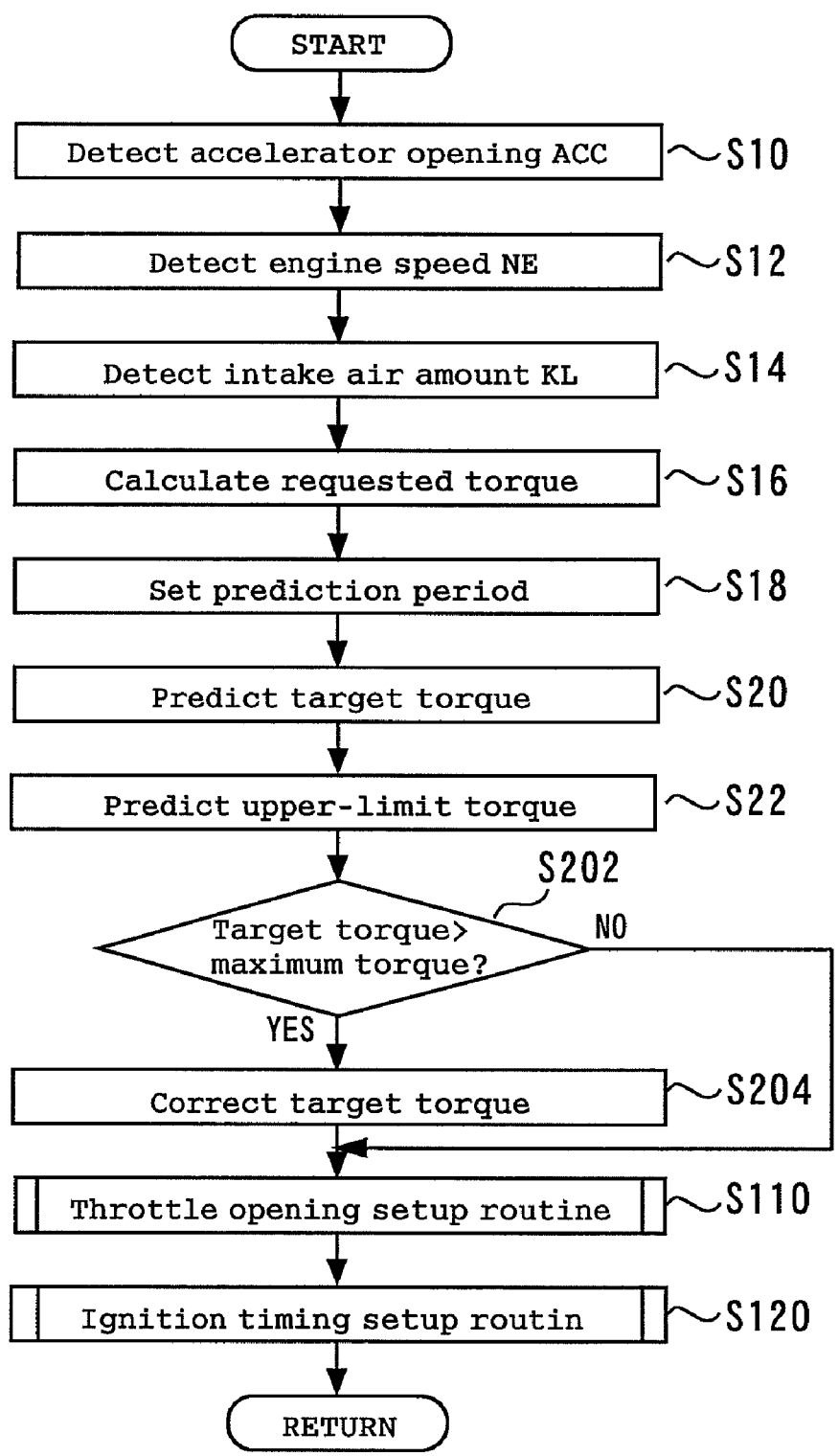
FIG. 12 is a flowchart illustrating a control routine that the ECU executes in accordance with the second embodiment of the present invention.

FIG. 12 is a flowchart illustrating a control routine that the ECU 40 executes in accordance with the second embodiment of the present invention. The flowchart shown in FIG. 12 is the same as the flowchart shown in FIG. 8 except that steps S202 and S204 are performed between step S22 and step S110 of the routine shown in FIG. 8.

After step S22 in FIG. 12 is performed to determine the upper-limit torque, step S202 is performed to judge whether the target torque (a1) is greater than the maximum torque TRmax within the prediction period (response lag time T0). The maximum torque TRmax can be generated when the MBT ignition timing is used while the amount of intake air taken into the cylinder 12 is maximized after the throttle opening is maximized. If the judgment result obtained in step S202 does not indicate that the target torque>maximum torque TRmax within the prediction period, the flow proceeds to step S110 the throttle opening setup routine (step S110 and FIG. 9) and ignition timing setup routine (step S120 and FIG. 10) are executed.

If, on the other hand, the judgment result obtained in step S202 indicates that the target torque>the maximum torque within the prediction period, step S204 is performed to correct the target torque (a1). More specifically, the target torque value of a portion in which the target torque>maximum torque is corrected to the maximum torque TRmax. The corrected target torque (a2) shown in FIG. 11 is now obtained. In the subsequent throttle opening setup routine (step S110 and FIG. 9) and ignition timing setup routine (step S120 and FIG. 10), the corrected target torque (a2) is used instead of the target torque (a1) to set the throttle opening and ignition timing. Subsequently, this process terminates.

As described above, when the target torque is greater than the maximum torque TRmax that can be generated, the second embodiment corrects the target torque value to the maximum torque TRmax and then proceeds to set the throttle opening and ignition timing. This makes it possible to prevent the system from exercising control in compliance with a requested torque that cannot be output, and let the system exercise control to generate a torque that can be output and is close to the target torque.

Third Embodiment

A third embodiment of the present invention will now be described with reference to FIGS. 13 to 15. However, characteristic portions of the third embodiment will be mainly described while briefly describing matters common to the first and third embodiments or skipping the description of such matters.

The system according to the third embodiment has the same configuration as the system shown in FIG. 1. Further, the system according to the third embodiment provides the same control as the system according to the first embodiment except that the former determines a lower-limit torque within an available torque range and exercises control so as to minimize a deviation of the target torque from an output range between the upper-limit torque and lower-limit torque. FIG. 13 illustrates the relationship between the target torque, upper-limit torque, lower-limit torque, and generated torque. In FIG. 13, the horizontal axis represents time whereas the vertical axis represents torque.

Figure 13:
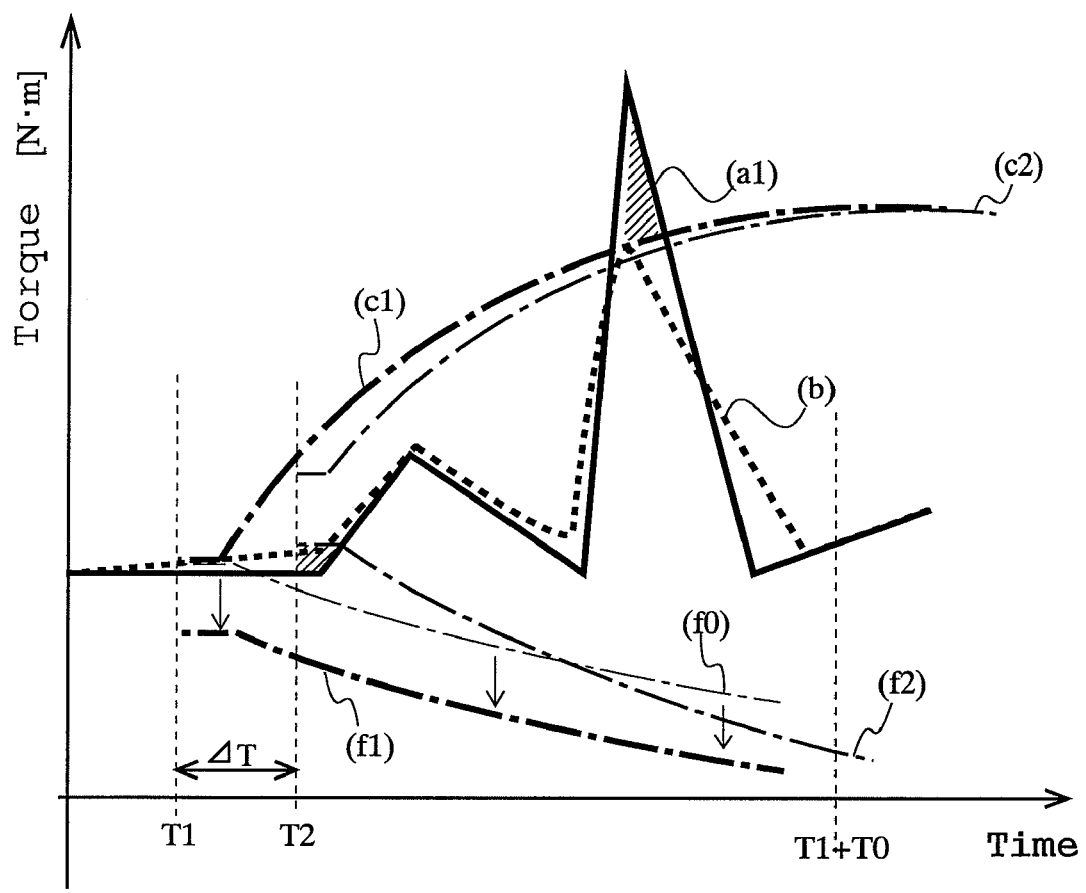
FIG. 13 illustrates the relationship between the target torque, upper-limit torque, lower-limit torque, and generated torque.

In FIG. 13, the waveform of the upper-limit torque that can be output at time T1 represents a torque that is obtained when the throttle valve 32 is fully opened at time T1 with the MBT ignition timing employed, and is indicated by a one-dot chain line (c1).

Meanwhile, the lower-limit value of a torque (lower-limit torque) that can be output by means of throttle opening control and ignition timing retardation control is determined by adding a torque decrease provided when the throttle valve 32 is closed to a permissible minimum opening to a torque decrease provided by ignition timing retardation. More specifically, when control is exercised to change the opening of the throttle valve 32 in a closing direction, there is a response lag before the intake air amount matches the resulting throttle opening. In other words, the torque does not immediately decrease after control is exercised to change the opening of the throttle valve 32 in a closing direction at time T1. Instead, the torque gradually decreases when the amount of intake air supplied to the cylinder actually decreases. On the other hand, the response to ignition timing control is quick. Therefore, when ignition timing retardation control is exercised to decrease the torque, the intended torque decrease is achieved simultaneously with ignition timing retardation. Consequently, referring to FIG. 13, the current lower-limit torque at time T1 is indicated by a curve (f1) that is obtained by moving a torque change curve (f0), which represents a torque that gradually decreases from the actual torque at time T1 due to control exercised to decrease the throttle opening, by the amount of torque decrease provided by ignition timing retardation.

The upper-limit torque (c1) and lower-limit torque (f1) at time T1 vary depending, for instance, on how the throttle opening is controlled at time T1 and how much torque is generated. In other words, the throttle opening selected at a certain time Ti and the torque generated accordingly affect the upper-limit torque and lower-limit torque at a later time.

Consequently, although the upper-limit torque (c1) and lower-limit torque (f1) at time T1 indicate a range of torque that can be output depending on the throttle opening selected at time T1, as indicated, for instance, in FIG. 13, it does not mean that torque can be freely controlled within the above range at a later time T2. If, for instance, control is exercised at time T1 to change the throttle opening in an opening direction so that the torque generated at time T2, which is later than time T1 by ΔT, is greater than the torque generated at time T1, the upper-limit torque that can be output during the prediction period for time T2 is equal at this moment to a torque obtained when the throttle opening is maximized, and indicated by a one-dot chain line (c2). Meanwhile, control is exercised at time T2 so that the throttle opening is larger than at time T1. Therefore, the lower-limit torque controllable at this moment is greater than at time T1 and indicated by a one-dot chain line (f2). As described above, the throttle opening selected at a certain time varies the range of torque that can be output at a later time.

The ECU 40 estimates a change in the permissible output range that is determined by the upper-limit torque and lower-limit torque as described above. If the target torque (a1) drastically increases or decreases, the ECU 40 calculates a throttle opening control pattern during the prediction period (response lag time T0) so as to minimize the deviation of the target torque from the estimated permissible output range. The throttle opening is set in accordance with the calculated throttle opening control pattern. This makes it possible to minimize an excess portion of torque that is outside the permissible output range, and generate torque in accordance with the target torque wherever possible.

Figure 14:
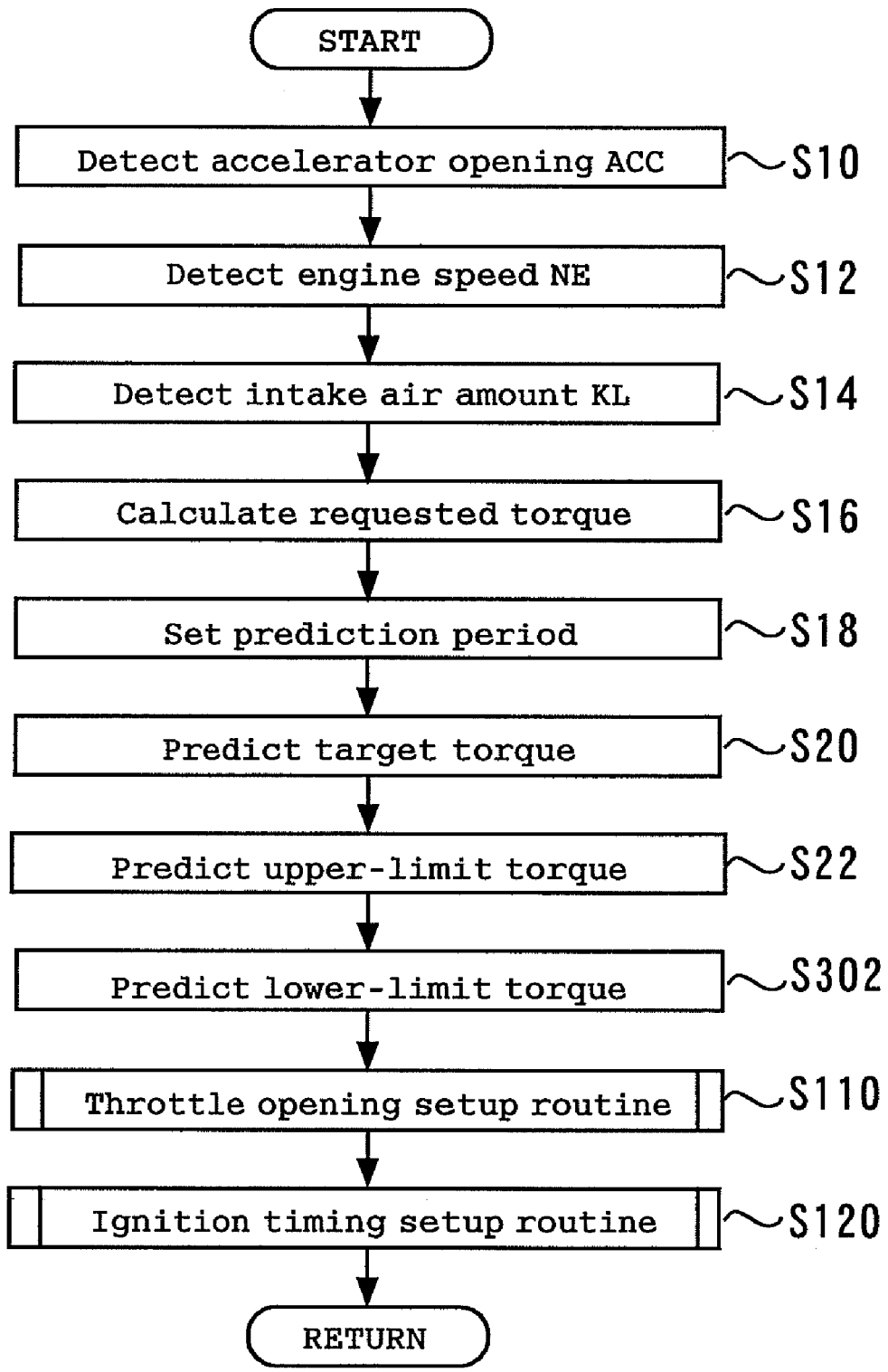
FIGS. 14 and 15 are flowcharts illustrating control routines that the ECU 40 executes in accordance with the third embodiment of the present invention.
Figure 15:
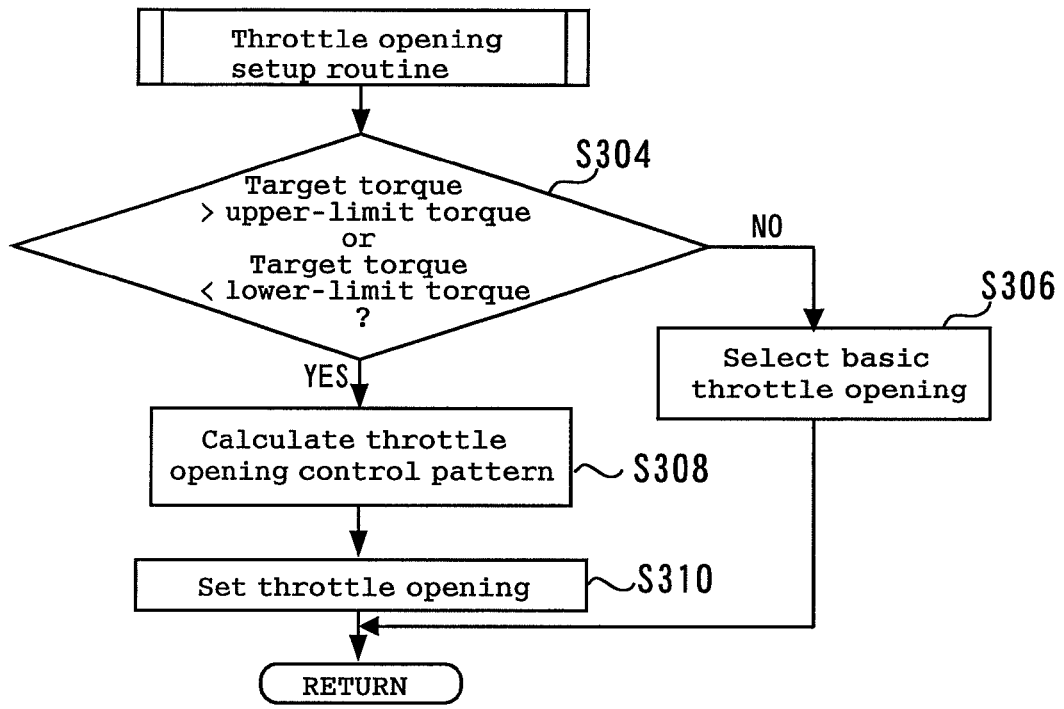

FIGS. 14 and 15 are flowcharts illustrating control routines that the ECU 40 executes in accordance with the third embodiment of the present invention. The routine shown in FIG. 14 is the same as the routine shown in FIG. 8 except that step S302 is performed between step S22 and Step S110 of the routine shown in FIG. 8 and that the routine shown in FIG. 15 is performed as a throttle opening setup routine in step S110 instead of the routine shown in FIG. 9.

More specifically, after the upper-limit torque is calculated in step S22 of the routine shown in FIG. 14, step S302 is performed to determine the lower-limit torque for the present time Ti. The lower-limit torque is determined by decreasing the torque, which is changed by decreasing the throttle opening to the minimum permissible opening, by the amount of torque decrease caused by ignition timing retardation. After the lower-limit torque is calculated in the above manner, step S110 is performed to execute the throttle opening setup routine.

First of all, the throttle opening setup routine performs step S304, as shown in FIG. 15, to judge whether the target torque is outside the permissible output range, which is between the upper-limit torque and lower-limit torque, during the prediction period for time Ti. If the judgment result obtained in step S304 does not indicate that the target torque is outside the permissible output range, step S306 is performed to set the throttle opening to the basic throttle opening. The throttle opening setup routine then terminates. After termination of the throttle opening setup routine, step S120 is performed to execute the ignition timing setup routine.

If, on the other hand, the judgment result obtained in step S304 indicates that the target torque is outside the permissible output range, step S308 is performed to calculate a throttle opening control pattern. More specifically, the ECU 40 estimates a change in the permissible output range that occurs during the prediction period for the present time Ti, and calculates a permissible output change range pattern that minimizes the total target torque deviation from the permissible output range during the prediction period. Subsequently, the throttle opening control pattern for the prediction period is set up so that the permissible output change ranges in such a calculated pattern as to minimize the total torque that cannot be output.

Next, step S310 is performed to set the throttle opening to the throttle opening for the present time Ti in accordance with the throttle opening control pattern that was set in step S308. Subsequently, the throttle opening setup routine terminates. After termination of the throttle opening setup routine, step S120 is performed to execute the ignition timing setup routine. In a state where the throttle opening is controlled in accordance with the throttle opening control pattern, the ignition timing setup routine performs step S124 to calculate the proportion of the target torque to the current torque, which is expected to be generated when the MBT ignition timing is employed, as the torque decrease rate. Step S126 is then performed to set the ignition timing retard amount in accordance with the calculated torque decrease rate.

As described above, when the torque to be generated is to be controlled by regulating the throttle opening and ignition timing, the third embodiment determines the upper-limit torque and lower-limit torque that can be output from the present time, and sets the throttle opening control pattern so as to minimize the total amount of target torque outside the permissible output range defined by the upper-limit torque and lower-limit torque. Therefore, when the target torque repeatedly increases or decreases, it is possible to reduce the difference between the actually generated torque and the target torque. Further, a torque request involving an uncontrollably large or small range of torque can be ignored. This makes it possible to prevent an uncontrollable torque increase/decrease request from degrading the torque control capability or making fuel efficiency loss unduly great.

Fourth Embodiment

A fourth embodiment of the present invention will now be described with reference to FIGS. 16 to 18. However, characteristic portions of the fourth embodiment will be mainly described while briefly describing matters common to the first to fourth embodiments or skipping the description of such matters. The system according to the fourth embodiment has the same configuration as the system shown in FIG. 1. Further, the system according to the fourth embodiment provides the same control as the system according to the first embodiment except that the former exercises control over a target torque having short change intervals by means of selective ignition timing retardation.

Figure 16:
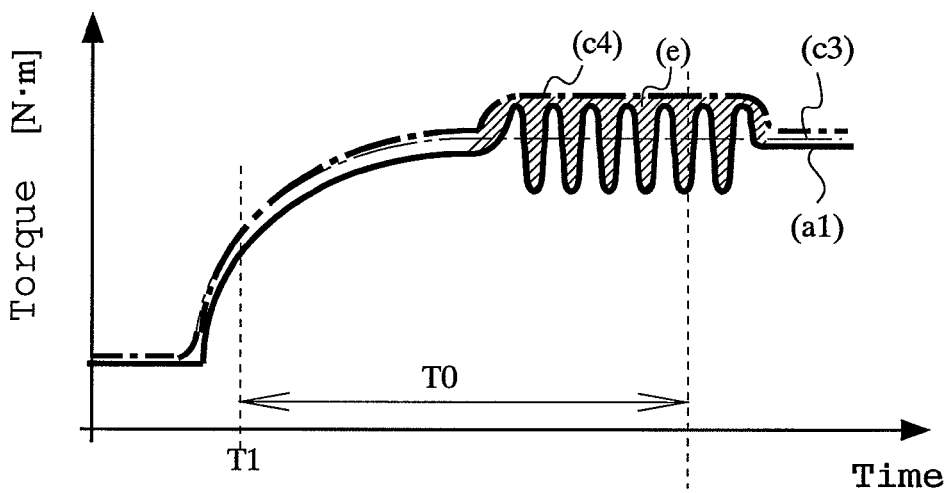
FIG. 16 illustrates the target torque, upper-limit torque, and generated torque according to the fourth embodiment of the present invention.

FIG. 16 illustrates the target torque, upper-limit torque, and generated torque according to the fourth embodiment of the present invention. If, as shown in FIG. 16, the target torque (a1) has a portion that periodically changes at intervals shorter than the response lag time T0, the intake air amount cannot be changed in accordance with a change occurring at short intervals (short-period change) even when control is exercised to maximize the throttle opening in advance as described earlier. It means that controlling the intake air amount alone does not make it possible to increase or decrease the torque in accordance with a short-period change. Therefore, when the target torque changes at short intervals, the fourth embodiment exercises control as described below.

First of all, a high-pass filter for passing only a change that occurs at intervals longer than the response lag time T0 is used to extract a change in a main target torque (average target torque) from a waveform of a target torque prevailing at time Ti. As regards the extracted average target torque, changes other than a short-period change are rendered the same as those in the target torque. However, the short-period change is averaged as indicated by a thin one-dot chain line (c3) in FIG. 16.

Meanwhile, a low-pass filter for passing only a change that occurs at intervals shorter than the response lag time T0 is used to extract the oscillation of the short-period change from the waveform of the target torque prevailing at time Ti.

The upper-limit torque for a short-period change (short-period upper-limit torque), which is used as a target in throttle opening setup, is set as described below. First of all, as regards a portion other than the short-period change that has passed through the high-pass filter, the average target torque that has passed through the high-pass filter is directly set as the short-period upper-limit torque. As regards the short-period change, on the other hand, half the amplitude of the short-period change that has passed through the low-pass filter is added to the average target torque that has passed through the high-pass filter. The resulting torque is then set as the short-period upper-limit torque. Therefore, the short-period upper-limit torque is set to be equal to the maximum torque within each target torque change cycle during the short-period change as indicated by a one-dot chain line (c4).

In a situation where the throttle opening is set during a short-period change as described above, Equation (1) is used to determine the torque decrease rate from the short-period upper-limit torque (c4) and target torque (a1). Further, torque decrease correction control is exercised by retarding the ignition timing. As a result, control is exercised as indicated by a shaded area (e) in FIG. 16 to correct the torque difference between the short-period upper-limit torque (c4) and target torque (a1) by retarding the ignition timing and generate a torque that is equal to the target torque (a1).

Even when the target torque includes a portion that repeatedly changes at intervals shorter than the intake air response lag time T0, control is exercised as described above so that a target torque changing at short intervals can be followed to generate torque in compliance with a request. Further, control is exercised so that the short-period upper-limit torque (c4) agrees with the maximum torque within each short-period change cycle. This makes it possible to minimize the combustion efficiency decrease resulting from ignition timing retardation control.

FIG. 16 shows a case where the short-period change in the target torque (a1) occurs at a fixed frequency and at the same amplitude. However, the fourth embodiment assumes that the "short-period change" not only occurs regularly at a fixed frequency and at a fixed amplitude but also occurs to repeatedly increase/decrease the torque with a certain periodicity.

Figure 17:
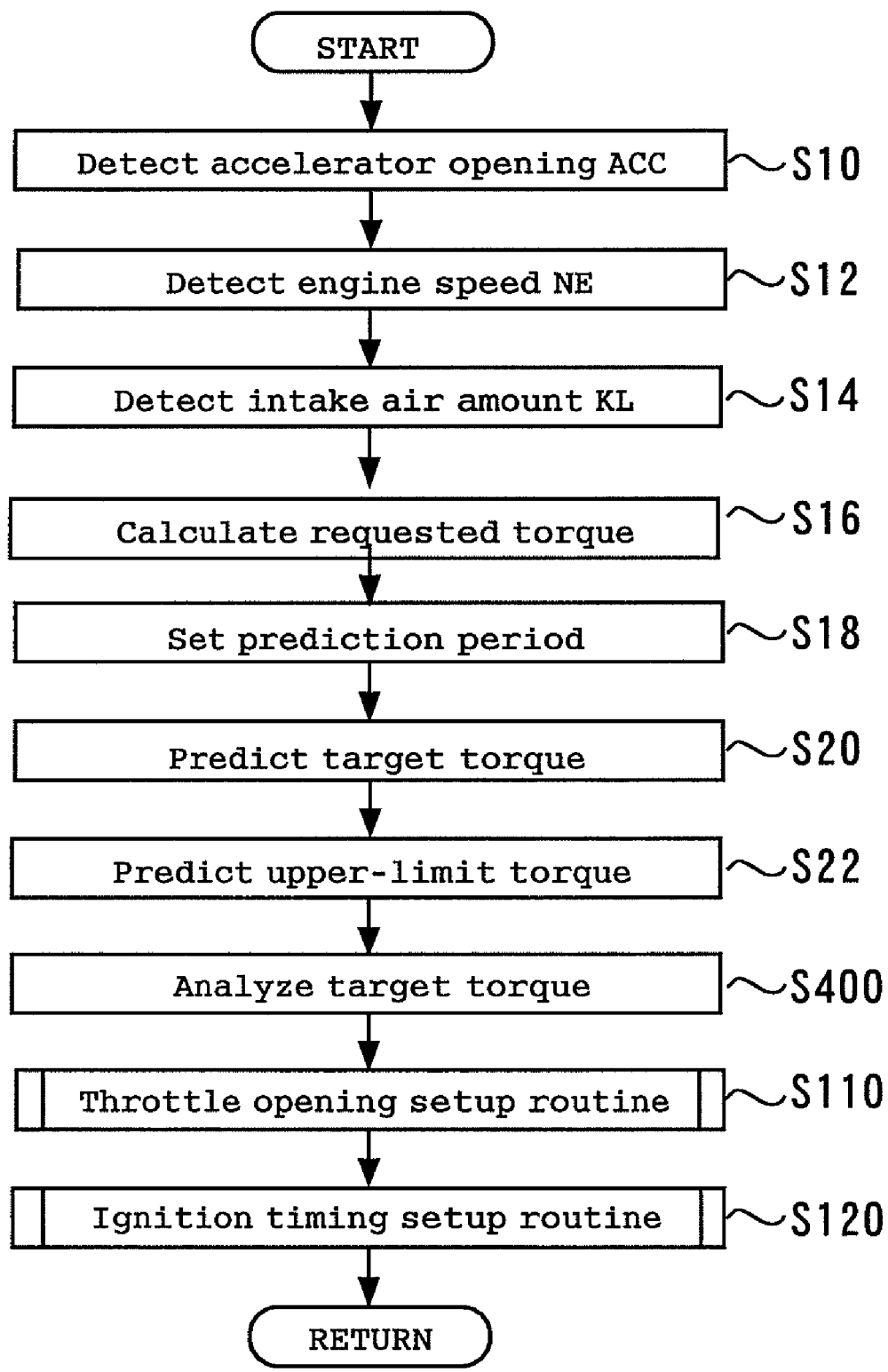
FIGS. 17 and 18 are flowcharts illustrating control routines that the ECU 40 executes in accordance with the fourth embodiment of the present invention.
Figure 18:
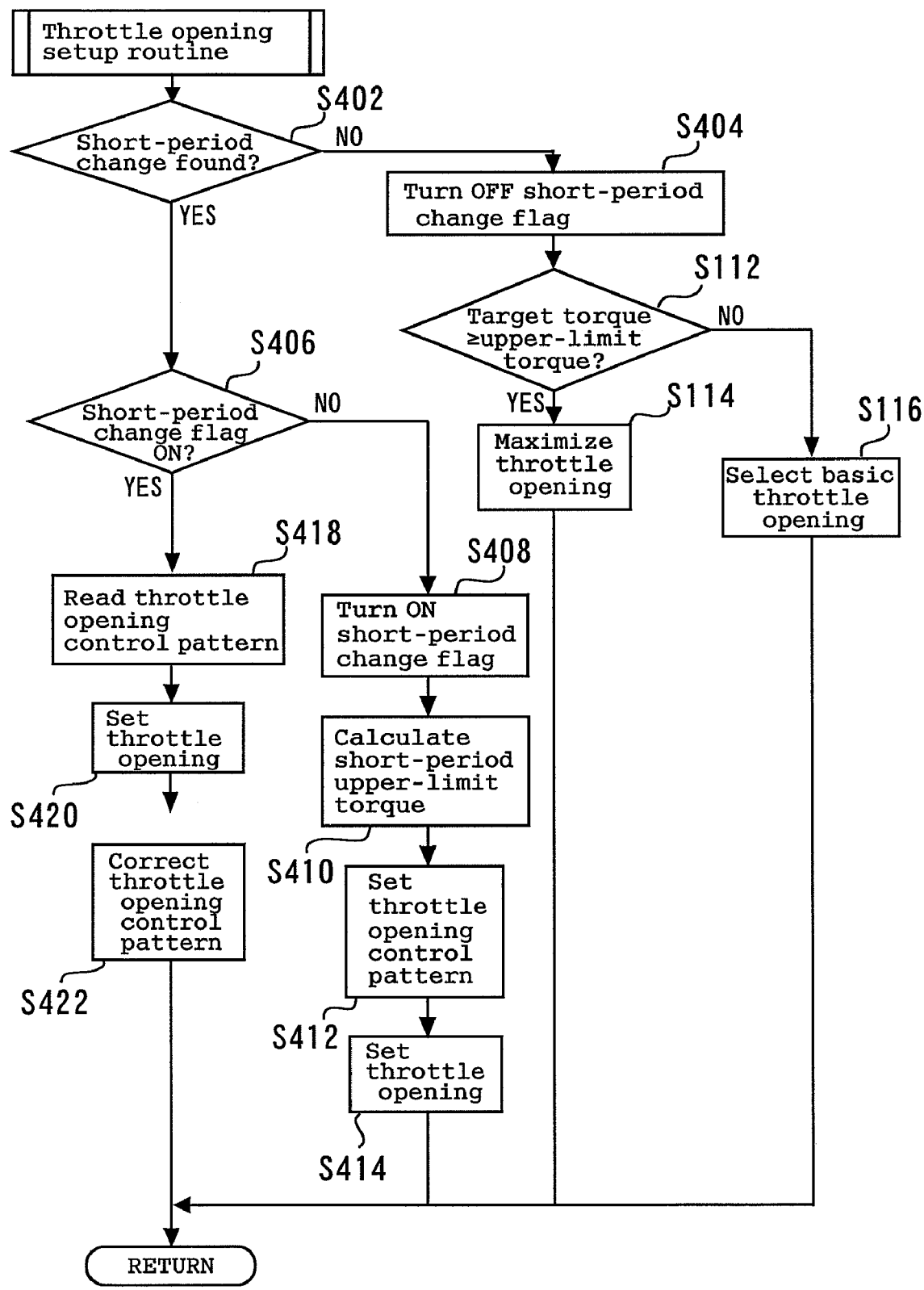

FIGS. 17 and 18 are flowcharts illustrating control routines that the ECU 40 executes in accordance with the fourth embodiment of the present invention. The routine shown in FIG. 17 is the same as the routine shown in FIG. 8 except that step S400 is performed between step S22 and S110 of the routine shown in FIG. 8 and that the routine shown in FIG. 18 is performed as a throttle opening setup routine in step S110 of the routine shown in FIG. 17 instead of the routine shown in FIG. 9.

After the upper-limit torque is calculated in step S22 of the routine shown in FIG. 17, step S400 is performed to analyze the target torque calculated in step S20. In the target torque analysis, a high-pass filter for passing only a change occurring at intervals longer than the response time lag T0 is used first to extract a change in the average target torque as a component of the target torque that changes at intervals longer than the response lag time T0. Further, a low-pass filter is used to extract a short-period change occurring at intervals shorter than the response lag time T0 from the target torque.

Subsequently, step S110 is performed to execute a throttle opening setup routine, which is shown in FIG. 18. First of all, the throttle opening setup routine performs step S402 to judge whether there is a short-period change in the target torque. Such a short-period change is checked for by judging whether a short-period change occurring at intervals shorter than the response lag time T0 is extracted by the target torque analysis in step S400. If the judgment result obtained in step S402 does not indicate that there is a short-period change in the target torque, step S404 is performed to turn OFF a short-period change flag. The short-period change flag turns ON when there is a short-period change. Subsequently, step S112 is performed, as is the case with the first embodiment, to judge whether condition A is established. If condition A is established, step S114 is performed to maximize the throttle opening to invoke a fully-open state. However, if condition A is not established, step S116 is performed to set the throttle opening to the basic throttle opening.

If, on the other hand, the judgment result obtained in step S402 indicates that there is a short-period change in the target torque, step S406 is performed to judge whether the short-period change flag is ON. The short-period change flag turns ON when a short-period change is observed in the waveform of the target torque. While this flag is ON, the throttle opening is controlled in accordance with a throttle opening control pattern according to the short-period change.

If the judgment result obtained in step S406 does not indicate that the short-period change flag is ON, step S408 is performed to turn ON the short-period change flag. Next, step S410 is performed to calculate the short-period upper-limit torque. More specifically, this step is performed to determine the amplitude of the short-period change prevailing after passage through the low-pass filter in accordance with the analysis in step S400 and calculate a torque by dividing the determined amplitude in half. Next, as regards the short-period change, the torque calculated by dividing the amplitude in half is added to the average target torque that has changed due to its passage through the high-pass filter. The short-period upper-limit torque is now determined.

Next, step S412 is performed to set a throttle opening control pattern. This step is performed to select a throttle opening control pattern that is required to achieve torque generation in accordance with the short-period upper-limit torque determined in step S410. Next, step S414 is performed in accordance with the throttle opening control pattern to set a throttle opening for the present time. Subsequently, the routine temporarily terminates. Then, the ignition timing setup routine is executed in step S120 to set the ignition timing retard amount in such a manner as to reduce the torque difference between the short-period upper-limit torque and target torque, and exercise torque decrease correction control.

If, on the other hand, the above routine is executed again at a certain time during a subsequent short-period change, step S406 is performed after short-period change recognition in step S402 to judge whether the short-period change flag is ON. Since the short-period change flag was already turned ON at the previous time, the judgment result obtained in step S406 indicates that the short-period change flag is ON. Step S418 is then performed to read the previously set throttle opening control pattern. Subsequently, step S422 is performed to set the throttle opening for the present time in accordance with the throttle opening control pattern. Next, step S424 is performed to correct the throttle opening control pattern as needed in accordance with the target torque for the present time. Subsequently, the throttle opening setup routine terminates.

As described above, when a periodic torque change occurs at intervals shorter than the response lag time T0, the fourth embodiment controls the throttle opening to obtain the maximum short-period torque within the short-period change. Minute control relative to a torque change request is exercised by retarding the ignition timing. Therefore, even if the requested torque changes at intervals shorter than the response time of the throttle valve, it is possible to generate the requested torque while minimizing the decrease in the combustion efficiency.

The fourth embodiment has been depicted on the assumption that the short-period change in the target torque (a1) occurs at a fixed frequency and at the same amplitude. However, the "short-period change" according to the present invention not only includes a change that occurs regularly at a fixed frequency and at a fixed amplitude, but also includes a change that occurs to repeatedly increase/decrease the torque with a certain periodicity. In this instance, the requested torque prevailing during a throttle opening short-period change can be set to be equal to the maximum short-period torque during each cycle instead of adding half the amplitude to the average target torque. This makes it possible to cope with a gradual amplitude change by exercising control as described above. For a drastic torque increase during a short-period change, however, it is preferred that control for maximizing the throttle opening in the same manner as the first embodiment be initiated in time for the torque increase.

The fourth embodiment has been described on the assumption that control is exercised when there is a short-period change in the target torque calculated in accordance with a requested torque. However, the present invention is not limited to such a situation. The present invention can also be applied, for instance, to a situation where some future torque changes during an automatic or other operation are predicted. When, for instance, an overall short-period change can be predicted, an alternative would be to create a throttle opening control pattern for the short-period change at one time or preregister such a control pattern, and switch to the control pattern to cope with the short-period change when it occurs.

Further, the fourth embodiment has been described on the assumption that the torque decrease rate is determined, each time the throttle opening or the like is set, from the target torque and the maximum torque during short-period control over a short-period change to calculate the ignition timing retard amount. However, the present invention is not limited to such a situation. In a situation where, for example, a certain future target torque can be predicted, an alternative would be to calculate an ignition timing control pattern at one time or preregister it, and switch to the ignition timing control pattern to exercise ignition timing control when a short-period change begins.

When the number, quantity, amount, range, or other numerical attribute of an element is mentioned in the description of the above embodiments, the present invention is not limited to the mentioned numerical attribute unless it is expressly stated or theoretically defined. Further, structures and steps of methods described in conjunction with the embodiments are not necessarily essential to the present invention unless they are expressly stated or theoretically defined.

The features and the advantages of the present invention as described above may be summarized as follows.

According to one aspect of the present invention the control device controls an output by first and second output change device which have different responsiveness from one another. If the deviation of the target output from the variable output range is greater than the judgment value during the prediction period, the first output change device changes the output in accordance with the variable output range, and the second output change device corrects the output difference between the target output and the output changed by the first output change device with higher responsiveness than the first output change device. Accordingly, it's possible to obtain a necessary output even when the target output drastically changes.

According to another aspect of the present invention, the judgment value is zero. Therefore, when the target output is outside the variable output range, the first output change device is controlled to start exercising output change control. Accordingly, it's possible to cope with a drastic change in the target output with increased certainty.

According to another aspect of the present invention, the target output change pattern and variable output change range pattern that prevail during the prediction period are estimated. Further, the first output change device is controlled so that the variable output range changes according to the variable output change range pattern with timing with which the target output agrees with the output range. This makes it possible to estimate a control operation over an appropriate output range in accordance with a change in the target output and start exercising control with more precise timing.

According to another aspect of the present invention, when the target output exceeds the maximum output, the target output of a portion in which the target output is greater than the maximum output so that the target output agrees with the maximum output. This makes it possible to curb the influence of a request for a great output that cannot be generated, and let the first output change device initiate output change control with more precise timing.

According to another aspect of the present invention, during a short-period change during which the target output changes at intervals shorter than the response lag, a short-period upper-limit output for the short-period change is calculated by using the sum of the average of the target output during the short-period change and half the amplitude during the short-period change. When the deviation of the short-period upper-limit output from variable output range is greater than the judgment value, the first output change device is controlled to start changing the output in accordance with the variable output range and the second output change device is controlled to correct the output difference between the short-period upper-limit output and the target output. Therefore, even when the target output changes at intervals shorter than the control response lag time, it is possible to generate an output according to the target output with increased accuracy.

According to another aspect of the present invention, the change pattern of the output range is calculated so that a total deviation of the target output from the variable output range is minimized during the prediction period, and in accordance with the change pattern, the variable output change to be brought about by the first output change device is controlled. In addition, the second output change device is controlled to correct the output difference between the target output and the maximum output that can be changed by the first output change means at the present time. Therefore, an output can be generated to the maximum extent possible in accordance with a wide range of requests even when a requested output is outside a permissible output range.

According to another aspect of the present invention, a control device is applied for an internal combustion engine. Further, when the target torque is greater than an available torque by more than a judgment value, the control device exercises control to change the intake air amount accordingly. Therefore, even when the target torque drastically increases, a necessary intake air amount can be provided to prepare for such a drastic target torque increase. Furthermore, when the intake air amount is increased at an early stage to prepare for a drastic torque increase, the intake air amount becomes excessive before the torque drastically increases relative to the target torque, thereby increasing the available torque. Therefore, control is exercised to decrease the torque difference between the available torque and target torque. In this instance, however, a fuel efficiency loss arises. However, the control device can increase the intake air amount only when the target torque is greater than the available torque by more than the judgment value, and retards the timing for the start of intake air amount increase to a point of time that provides the minimum amount of time required for intake air amount acquisition. Consequently, it is possible to reduce the fuel efficiency loss that arises when the intake air amount begins to increase.

According to another aspect of the present invention, when the intake air amount is controlled by regulating the throttle opening, there is a relatively long response lag between the instant at which the throttle opening is controlled and the instant at which a cylinder of the internal combustion engine actually takes in an amount of intake air that is provided by the throttle opening. Therefore, it may be difficult to immediately generate torque in compliance with a request. However, a control device can determine a target torque for predicting a requested torque and open the throttle valve before an increase in the target torque. Therefore, even when the target torque drastically increases, it is possible to obtain a necessary amount of intake air in advance and become ready to generate torque in accordance with the obtained intake air amount. Further, an increase in the torque, which is provided by exercising control to operate the throttle valve in the opening direction, can be corrected by means having higher responsiveness than intake air responsiveness to constantly generate torque in accordance with the target torque.

According to another aspect of the present invention, as the ignition timing is retarded from the basic ignition timing, the torque can be decreased. Such a torque decrease, which is caused by retarding the ignition timing as described above, can be accomplished with higher responsiveness than intake air amount responsiveness. Therefore, a control device can properly correct the torque difference between the target torque and available torque to ensure that the generated torque agrees with the target torque.

According to another aspect of the present invention, when a requested torque based on a user's request is to be generated with a delay equivalent to the retardation time or when the internal combustion engine is to be operated in accordance with a control schedule based on an operating state, a torque request can be predicted to some extent. Therefore, a control device makes it possible to effectively predict a torque change and prepare for a drastic torque increase.

Obviously many modifications and variations of the present invention are possible in the light of the above teachings. It is therefore to be understood that within the scope of the appended claims the invention may by practiced otherwise than as specifically described.

The invention claimed is:

1. A control device comprising:
first output change device for changing an output;
second output change device for changing the output with higher responsiveness than the first output change device;
first control means for controlling the first output change device so as to output a target output;
second control means for controlling the second output change device so as to output a target output;
target output change prediction means for predicting a change in the target output that occurs during a predetermined prediction period;
variable output range prediction means for predicting a change in a variable output range that can be brought about by the first output change device during the prediction period;
output out-of-range judgment means for judging whether a deviation of the target output from the variable output range is greater than a judgment value during the prediction period; and
output difference calculation means for calculating the output difference between the target output and the output changed by the first output change device;
wherein first control means causes, when the deviation is judged to be greater than the judgment value, the first output change device to start to changing the output in accordance with the variable output range; and
wherein the second control means controls, when the deviation is judged to be greater than the judgment value, the second output change device in accordance with the output difference.

2. The control device according to claim 1, wherein the judgment value is zero.

3. The control device according to claim 2,
wherein the target output change prediction means estimates a change in the target output during the prediction period as a target output change pattern;

wherein the variable output range prediction means estimates a change in the variable output range during the prediction period as a variable output range pattern;

wherein the output out-of-range judgment means judges a timing with which the target output agrees with the variable output range; and wherein the first control means controls the first output change device so that the variable output range changes in accordance with the variable output range pattern with a timing with which the target output agrees with the variable output range.

4. The control device according to claim 1, the control device controlling the output of the internal combustion engine, wherein the first output change device changes an intake air amount for the internal combustion engine;

wherein the target output change prediction means regards a target torque for the internal combustion engine as the target output and predicts a change in the target output; and wherein the variable output range prediction means regards an available torque range, which can be output when the intake air amount is changed in a current operating state of the internal combustion engine, as the variable output range and predicts a change in the variable output range.

5. The control device according to claim 4, wherein the first output change device is a throttle valve positioned in an intake path of the internal combustion engine; and wherein the first control means controls the intake air amount by controlling the opening of the throttle valve.

6. The control device according to claim 4, wherein the second output change device is ignition device for the internal combustion engine, the control device further comprising:

basic ignition timing calculation means for calculating basic ignition timing in accordance with the intake air amount prevailing at a point of time during the prediction period;

retard amount calculation means for calculating an ignition timing retard amount relative to the basic ignition timing in accordance with the output difference; and corrected ignition timing setup means for setting corrected ignition timing that is obtained by retarding the basic ignition timing in accordance with the ignition timing retard amount;

wherein the second control means controls ignition timing in accordance with the corrected ignition timing.

7. The control device according to claim 4, further comprising:

accelerator operation amount detection means for detecting an accelerator operation amount; and requested torque calculation means for calculating a requested torque in accordance with a change in the accelerator operation amount;

wherein the target output change prediction means predicts a torque determined by retarding the requested torque by retardation time as the target output.

8. The control device according to claim 4, wherein the target output change prediction means predicts the target output in accordance with a control schedule based on an operating state during the prediction period.

9. The control device according to claim 1, further comprising:

maximum judgment means for judging whether the target output exceeds a maximum output of the variable output range during the prediction period; and target output correction means which, when the target output is judged to exceed the maximum output, corrects the target output of a portion in which the target output is greater than the maximum output so that the target output agrees with the maximum output.

10. The control device according to claim 9, the control device controlling the output of the internal combustion engine, wherein the first output change device changes an intake air amount for the internal combustion engine;

wherein the target output change prediction means regards a target torque for the internal combustion engine as the target output and predicts a change in the target output; and wherein the variable output range prediction means regards an available torque range, which can be output when the intake air amount is changed in a current operating state of the internal combustion engine, as the variable output range and predicts a change in the variable output range.

11. The control device according to claim 10, wherein the second output change device is ignition means for the internal combustion engine, the control device further comprising:

basic ignition timing calculation means for calculating basic ignition timing in accordance with the intake air amount prevailing at a point of time during the prediction period;

retard amount calculation means for calculating an ignition timing retard amount relative to the basic ignition timing in accordance with the output difference; and corrected ignition timing setup means for setting corrected ignition timing that is obtained by retarding the basic ignition timing in accordance with the ignition timing retard amount;

wherein the second control means controls ignition timing in accordance with the corrected ignition timing.

12. The control device according to claim 1, further comprising:

short-period change detection means for detecting a short-period change of the target output that periodically occurs at intervals shorter than response lag time relative to an output change brought about by the first output change device;

short-period output average calculation means for calculating the average of the target output during the short-period change;

short-period output amplitude calculation means for calculating the amplitude of the target output during the short-period change; and short-period upper-limit output calculation means for calculating a short-period upper-limit output for the short-period change, using the sum of the average of the target output during the short-period change and half the amplitude during the short-period change;

wherein the output out-of-range judgment means judges whether a deviation of the short-period upper-limit output, instead of the target output, from variable output range is greater than the judgment;

wherein the first control means, when the deviation is judged to be greater than the judgment value, causes the first output change device to start changing the output in accordance with the variable output range; and wherein the output difference calculation means calculates, as the output difference, a difference between the short-period upper-limit output and the target output during the short-period change.

13. The control device according to claim 12, the control device controlling the output of the internal combustion engine,
- wherein the first output change device changes an intake air amount for the internal combustion engine;
- wherein the target output change prediction means regards a target torque for the internal combustion engine as the target output and predicts a change in the target output; and
- wherein the variable output range prediction means regards an available torque range, which can be output when the intake air amount is changed in a current operating state of the internal combustion engine, as the variable output range and predicts a change in the variable output range.

14. The control device according to claim 13, wherein the second output change device is ignition means for the internal combustion engine, the control device further comprising:
- basic ignition timing calculation means for calculating basic ignition timing in accordance with the intake air amount prevailing at a point of time during the prediction period;
- retard amount calculation means for calculating an ignition timing retard amount relative to the basic ignition timing in accordance with the output difference; and
- corrected ignition timing setup means for setting corrected ignition timing that is obtained by retarding the basic ignition timing in accordance with the ignition timing retard amount;
- wherein the second control means controls ignition timing in accordance with the corrected ignition timing.

15. A control device comprising:
- first output change device for changing the output;
- second output change device for changing the output with higher responsiveness than the first output change device;
- target output change prediction means for predicting a change in the target output that occurs during a predetermined prediction period;
- variable output range prediction means for predicting a change in a variable output range that can be brought about by the first output change device during the prediction period;
- variable output range change pattern calculation means for calculating a change pattern of the variable output range so that a total deviation of the target output from the variable output range is minimized during the prediction period;
- first control means for controlling an output change brought about by the first output change device in accordance with the change pattern of the variable output range;
- output difference calculation means for calculating, at a current time during the prediction period, the output difference between the target output and the output of the change pattern at the current time that can be changed by the first output change device; and
- second control means which causes the second output change device to correct the output difference.

16. The control device according to claim 15, the control device controlling the output of the internal combustion engine,
- wherein the first output change device changes an intake air amount for the internal combustion engine;
- wherein the target output change prediction means regards a target torque for the internal combustion engine as the target output and predicts a change in the target output; and
- wherein the variable output range prediction means regards an available torque range, which can be output when the intake air amount is changed in a current operating state of the internal combustion engine, as the variable output range and predicts a change in the variable output range.

17. The control device according to claim 16, wherein the second output change device is ignition means for the internal combustion engine, the control device further comprising:
- basic ignition timing calculation means for calculating basic ignition timing in accordance with the intake air amount prevailing at a point of time during the prediction period;
- retard amount calculation means for calculating an ignition timing retard amount relative to the basic ignition timing in accordance with the output difference; and
- corrected ignition timing setup means for setting corrected ignition timing that is obtained by retarding the basic ignition timing in accordance with the ignition timing retard amount;
- wherein the second control means controls ignition timing in accordance with the corrected ignition timing.

18. The control device according to claim 16, further comprising:
- accelerator operation amount detection means for detecting an accelerator operation amount; and
- requested torque calculation means for calculating a requested torque in accordance with a change in the accelerator operation amount;
- wherein the target output change prediction means predicts a torque determined by retarding the requested torque by retardation time as the target output.

19. The control device according to claim 16,
- wherein the target output change prediction means predicts the target output in accordance with a control schedule based on an operating state during the prediction period.

20. A control device comprising:
- first output change device for changing an output;
- second output change device for changing the output with higher responsiveness than the first output change device;
- first controller for controlling the first output change device so as to output a target output;
- second controller for controlling the second output change device so as to output a target output;
- target output change prediction device for predicting a change in the target output that occurs during a predetermined prediction period;
- variable output range prediction device for predicting a change in a variable output range that can be brought about by the first output change device during the prediction period;
- output out-of-range judgment device for judging whether a deviation of the target output from the variable output range is greater than a judgment value during the prediction period; and
- output difference calculator for calculating the output difference between the target output and the output changed by the first output change device;
- wherein first controller causes, when the deviation is judged to be greater than the judgment value, the first output change device to start to changing the output in accordance with the variable output range; and
- wherein the second controller controls, when the deviation is judged to be greater than the judgment value, the second output change device in accordance with the output difference.

* * * * *